United States Patent
Shibamiya et al.

(10) Patent No.: US 7,522,087 B2
(45) Date of Patent: Apr. 21, 2009

(54) REMOTE CONTROL DEVICE

(75) Inventors: Yoshikazu Shibamiya, Kanagawa (JP);
Takashi Yamamoto, Kanagawa (JP);
Masaki Kutsuna, Kanagawa (JP); Tetsu Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 11/391,629

(22) Filed: Mar. 29, 2006

(65) Prior Publication Data

US 2006/0227033 A1 Oct. 12, 2006

Related U.S. Application Data

(63) Continuation of application No. 10/443,953, filed on May 23, 2003, now Pat. No. 7,071,865.

(30) Foreign Application Priority Data

May 27, 2002 (JP) ............................. 2002-152257

(51) Int. Cl.
*G08C 19/12* (2006.01)
(52) U.S. Cl. .......................... 341/176; 345/173; 725/37
(58) Field of Classification Search ................. 341/176; 345/158, 173; 348/468, 589; 715/716; 725/37–61
See application file for complete search history.

(56) References Cited

U.S. PATENT DOCUMENTS

| 5,032,975 | A | | 7/1991 | Yamamoto et al. .......... 364/134 |
| 5,136,222 | A | | 8/1992 | Yamamoto et al. .......... 318/568 |
| 5,532,753 | A | | 7/1996 | Buchner et al. ................ 725/56 |
| 5,889,506 | A | | 3/1999 | Lopresti et al. ............. 345/158 |
| 5,956,025 | A | * | 9/1999 | Goulden et al. ............. 715/716 |
| 6,078,663 | A | | 6/2000 | Yamamoto et al. ............. 380/9 |
| 6,133,847 | A | * | 10/2000 | Yang ...................... 340/825.22 |
| 6,201,951 | B1 | | 3/2001 | Duwaer et al. ............. 455/74.1 |
| 6,597,790 | B1 | | 7/2003 | Yamamoto et al. .......... 380/231 |
| 6,765,557 | B1 | | 7/2004 | Segal et al. |

(Continued)

FOREIGN PATENT DOCUMENTS

JP 02-127720 5/1990

(Continued)

OTHER PUBLICATIONS

Japanese Official Action dated Dec. 25, 2007 in corresponding Japanese application No. 2002-152257.

*Primary Examiner*—Timothy Edwards, Jr.
(74) *Attorney, Agent, or Firm*—Fitzpatrick, Cella, Harper & Scinto

(57) ABSTRACT

A display apparatus includes a receiving unit, a communication unit, a display unit and a control unit. The receiving unit receives from a remote control device position data corresponding to a contact position. The contact position is detected by a track pad unit and the track pad unit is included in the remote control device. The communication unit receives from an external device an operational panel used to control the external device. The display unit displays the operational panel received by the communication unit. The control unit controls the operational panel using the position data received by the receiving unit. The control unit allocates operable elements included in the operational panel to the track pad unit without changing an array of the operable elements included in the operational panel.

5 Claims, 27 Drawing Sheets

U.S. PATENT DOCUMENTS

| | | |
|---|---|---|
| 6,930,661 B2 | 8/2005 | Uchida et al. .................. 345/87 |
| 7,071,865 B2 * | 7/2006 | Shibamiya et al. .......... 341/176 |
| 2001/0015719 A1 * | 8/2001 | Van ee et al. ............... 345/158 |
| 2002/0049737 A1 | 4/2002 | Sakuma et al. .................. 707/1 |
| 2002/0053858 A1 | 5/2002 | Hayashi ................. 310/316.01 |
| 2003/0088798 A1 | 5/2003 | Ono et al. .................... 713/310 |
| 2005/0174489 A1 | 8/2005 | Yokoyama et al. .......... 348/553 |

FOREIGN PATENT DOCUMENTS

| | | |
|---|---|---|
| JP | 10-11288 | 1/1998 |
| WO | 01/78054 | 10/2001 |

* cited by examiner

FIG. 7

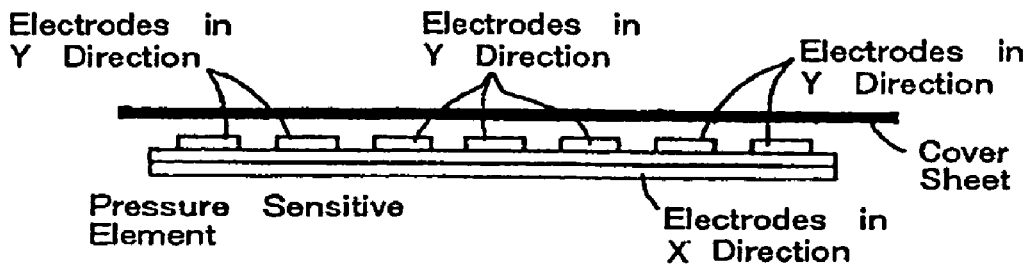

FIG. 8

| ID No. | Size, Bitmap, Position... | Allocated Element |
|---|---|---|
| ID1 | xxx, xxxxx, xxxxx, xxx | Panel element 1 |
| ID2 | xxx, xxxxx, xxxxx, xxx | Panel element 2 |
| ID3 | xxx, xxxxx, xxxxx, xxx | Panel element 3 |
| . | . | . |
| IDm | xxx, xxxxx, xxxxx, xxx | Icon element 1 |
| IDm+1 | xxx, xxxxx, xxxxx, xxx | Icon element 2 |
| IDm+2 | xxx, xxxxx, xxxxx, xxx | Icon element 3 |
| . | . | . |
| IDn | xxx, xxxxx, xxxxx, xxx | Text element 1 |
| IDn+1 | xxx, xxxxx, xxxxx, xxx | Text element 2 |
| IDn+2 | xxx, xxxxx, xxxxx, xxx | Text element 3 |

FIG. 9

| ID No. | Allocated Area |
|---|---|
| ID1 | Area 1 |
| ID2 | Area 2 |
| ID3 | Area 3 |
| . | . |
| IDn | Area n |

FIG. 10
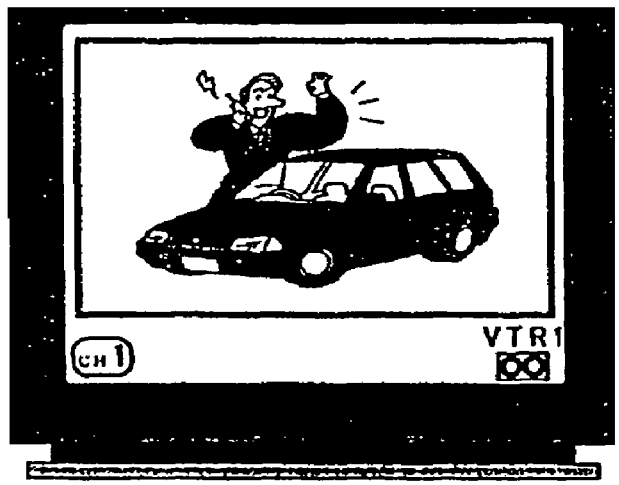
FIG. 11
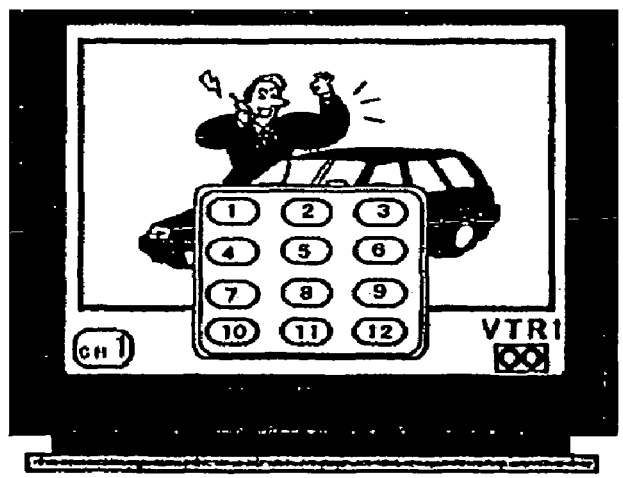
FIG. 12
| ID No. | Size, Bitmap, Position... | Allocated Channel |
|---|---|---|
| ID1 | xxx, xxxxx, xxxxx, xxx | Channel 1 |
| ID2 | xxx, xxxxx, xxxxx, xxx | Channel 2 |
| ID3 | xxx, xxxxx, xxxxx, xxx | Channel 3 |
| ID4 | xxx, xxxxx, xxxxx, xxx | Channel 4 |
| . | . | . |
| ID12 | xxx, xxxxx, xxxxx, xxx | Channel 12 |

FIG. 13A
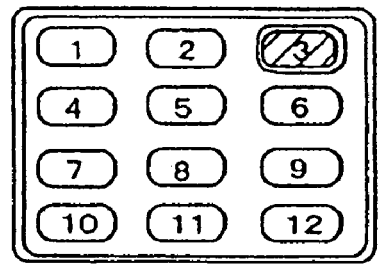
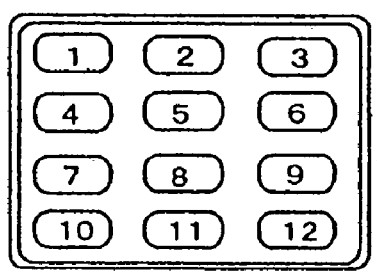
FIG. 13S
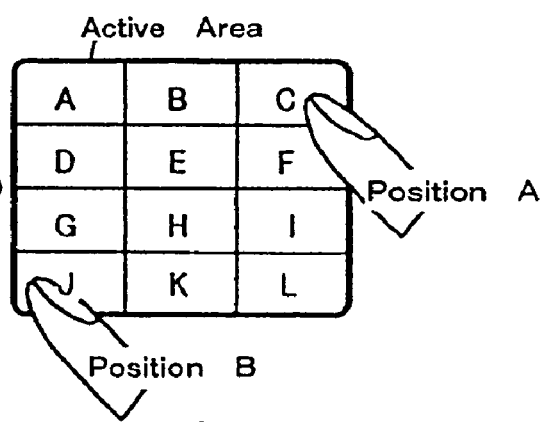
FIG. 13B
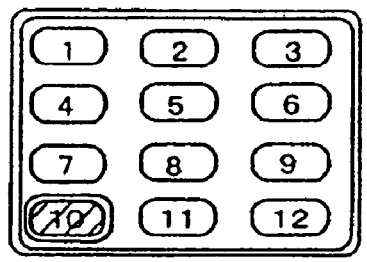
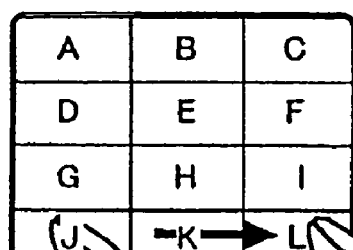
FIG. 13C
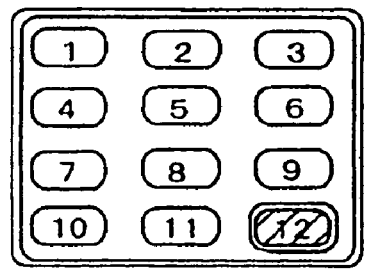

FIG. 14
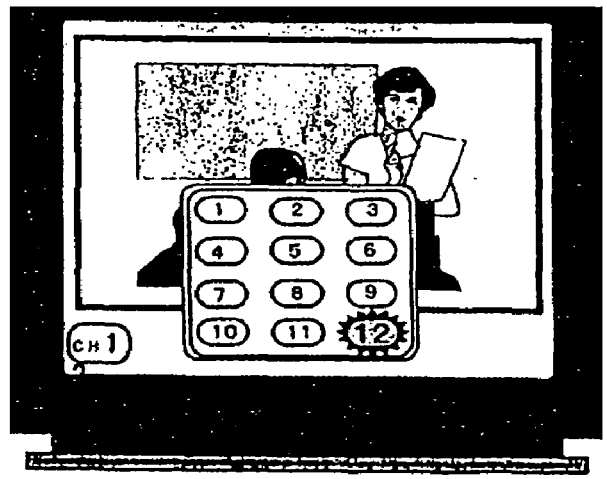
FIG. 15
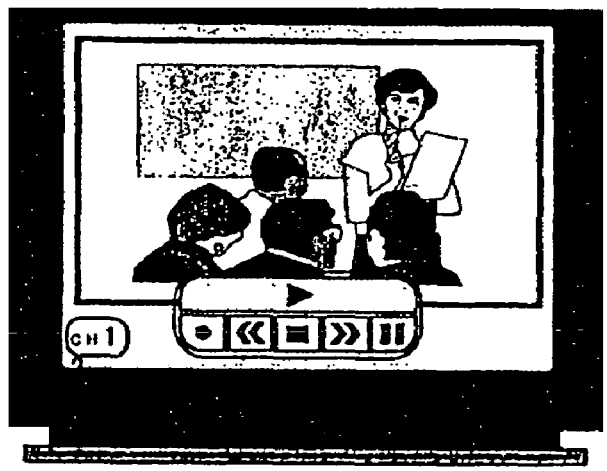
FIG. 16
| ID No. | Size, Bitmap, Position... | Allocated Channel |
|---|---|---|
| ID1 | xxx, xxxxx, xxxxx, xxx | Replay |
| ID2 | xxx, xxxxx, xxxxx, xxx | Record |
| ID3 | xxx, xxxxx, xxxxx, xxx | Rewind |
| ID4 | xxx, xxxxx, xxxxx, xxx | Stop |
| ID5 | xxx, xxxxx, xxxxx, xxx | Fast-Forward |
| ID6 | xxx, xxxxx, xxxxx, xxx | Temporal Stop |

FIG. 17M
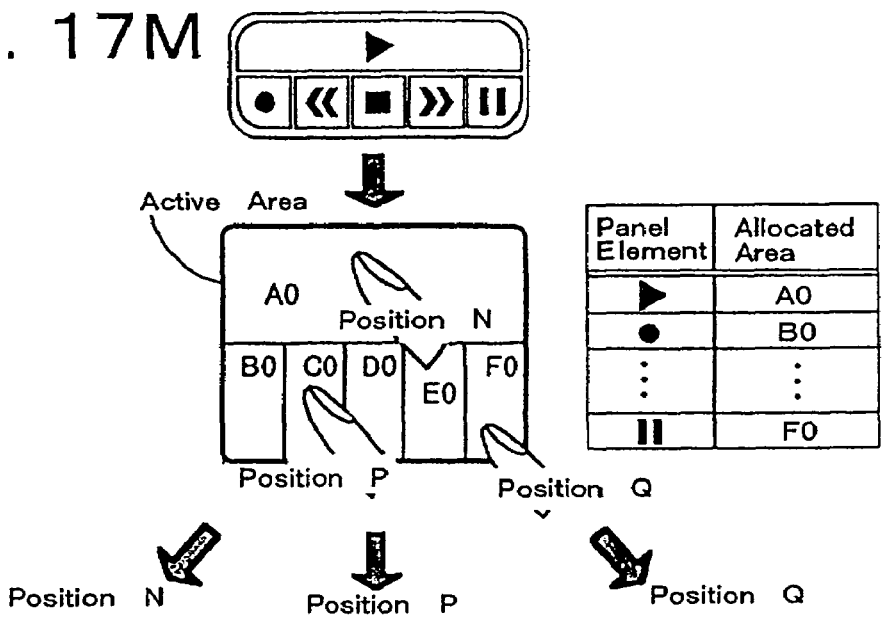
FIG. 17N
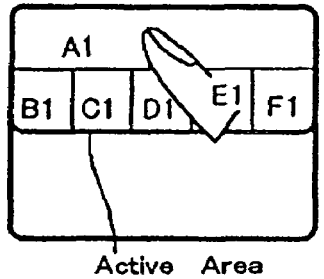
FIG. 17P
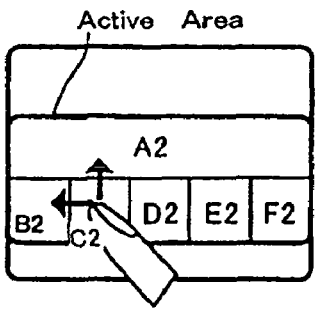
FIG. 17Q
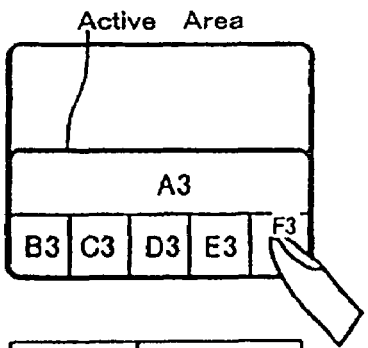
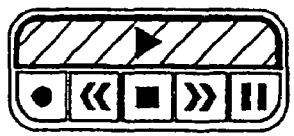
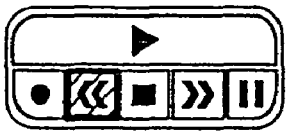
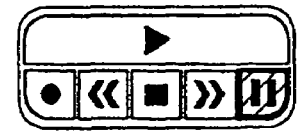

FIG. 18R
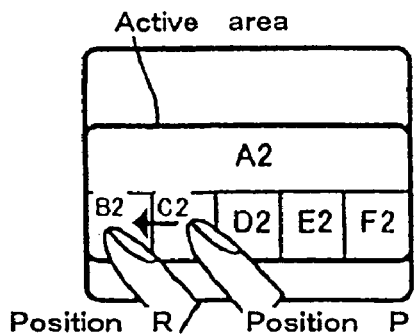
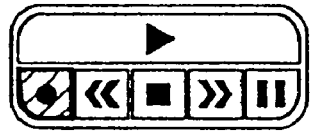
FIG. 18S
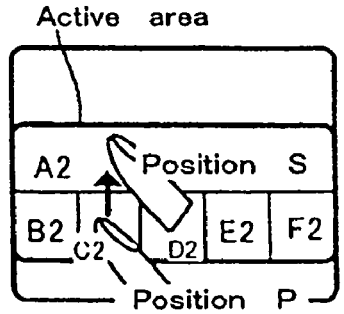
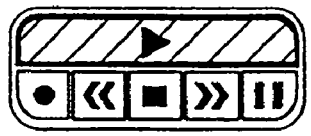
FIG. 18T
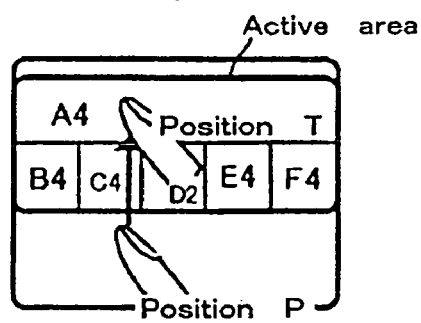
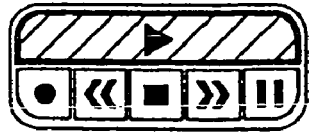

FIG. 19
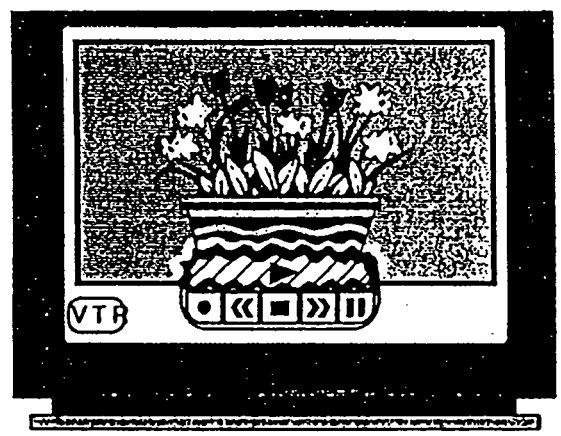
FIG. 20F
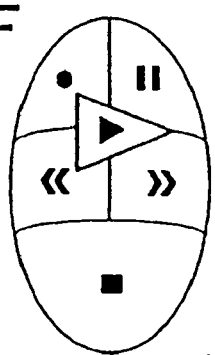 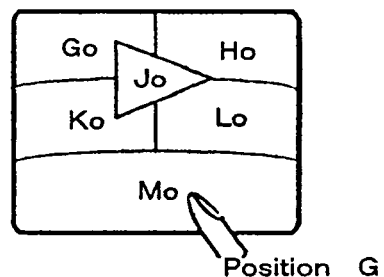
FIG. 20G
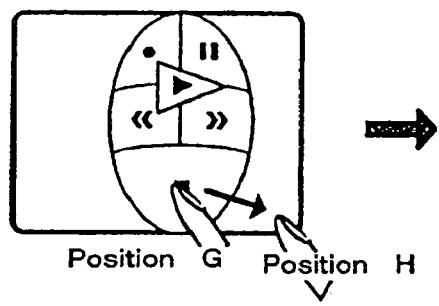
FIG. 20H
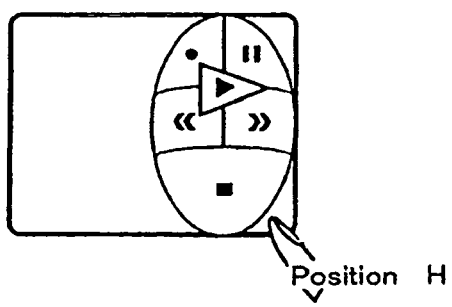
FIG. 20J
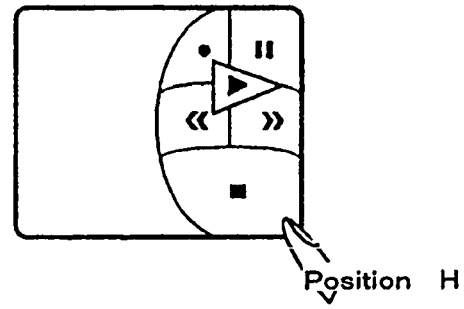

FIG. 22
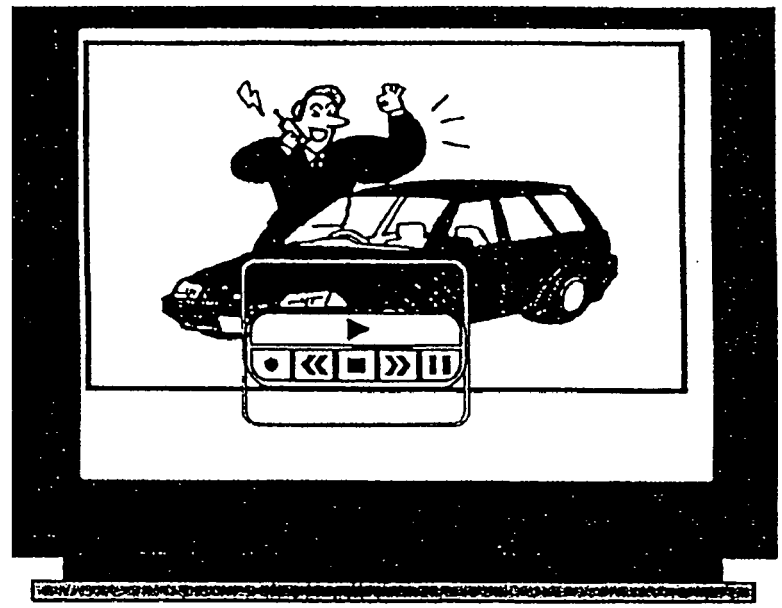
FIG. 23U
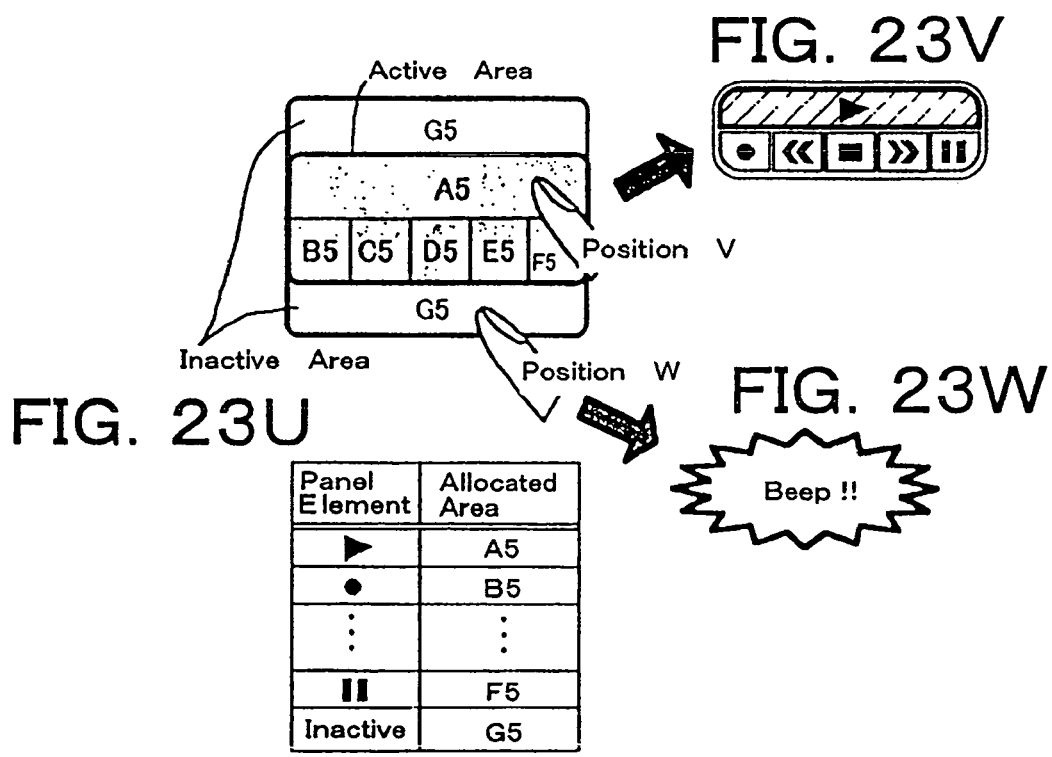
FIG. 23V
FIG. 23W

FIG. 24
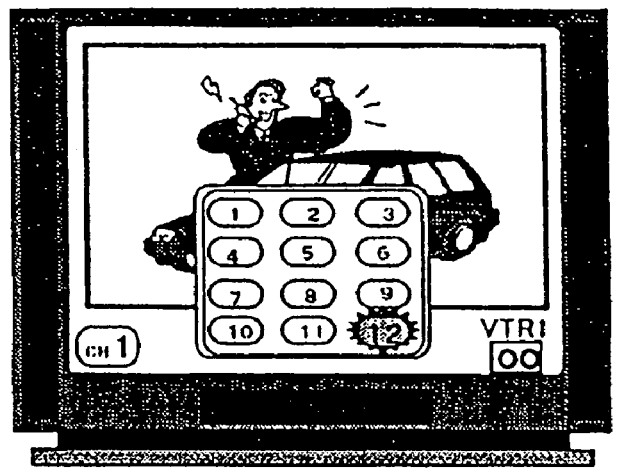
FIG. 25A 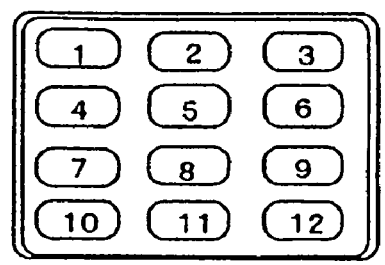 = FIG. 25B 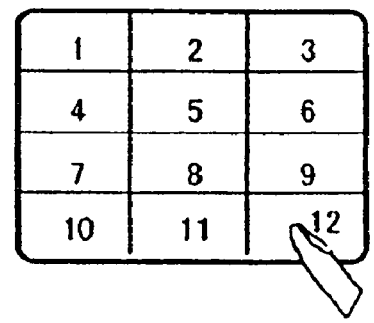
FIG. 25C
| Panel Element | Allocated Area |
|---|---|
| 1 | 1 |
| 2 | 2 |
| 3 | 3 |
| 4 | 4 |
| ⋮ | ⋮ |
| 11 | 11 |
| 12 | 12 |

FIG. 27
| PID1 | Size, Bitmap, Position | Allocated Key bottan |
|---|---|---|
| ID1 | xxx, xxxxx | A |
| ID2 | xxx, xxxxx | B |
| ID3 | xxx, xxxxx | C |
| IDc | xxx, xxxxx | D |
| ⋮ | ⋮ | ⋮ |
| IDx | xxx, xxxxx | Enter |
FIG. 28A
FIG. 28B
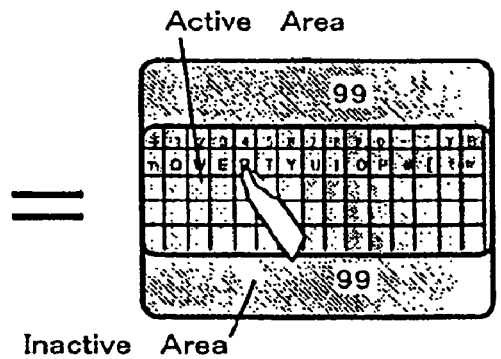
Active Area
Inactive Area
FIG. 28C
| Panel Element | Allocated Area |
|---|---|
| ¥ | 1 |
| 1 | 2 |
| 2 | 3 |
| 3 | 4 |
| ⋮ | ⋮ |
| Alt | m |
| Ctrl | n |
| Inactive | 99 |

FIG. 29A
 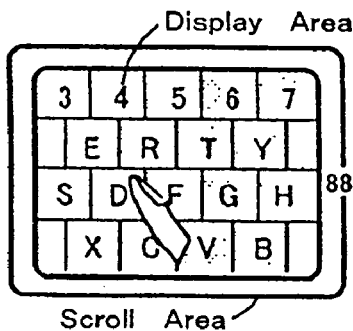
| Panel Element | Allocated Area |
|---|---|
| 3 | 1 |
| 4 | 2 |
| ⋮ | ⋮ |
| N | 22 |
| Scroll | 88 |
FIG. 29B
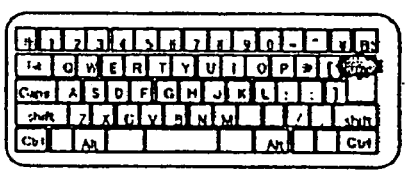 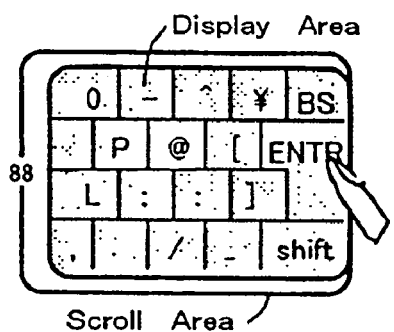
| Panel Element | Allocated Area |
|---|---|
| O | 1 |
| P | 7 |
| ⋮ | ⋮ |
| Shift | 19 |
| Scroll | 88 |
FIG. 29C
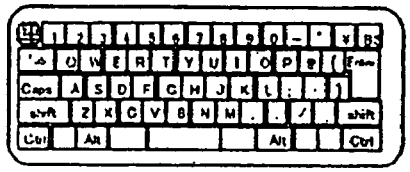 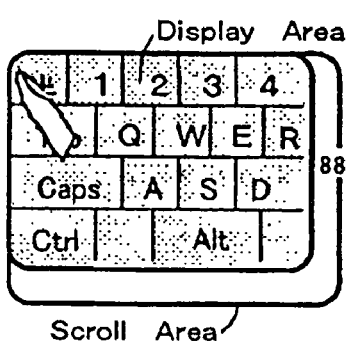
| Panel Element | Allocated Area |
|---|---|
| ¥ | 1 |
| 1 | 2 |
| ⋮ | ⋮ |
| Alt | 17 |
| Scroll | 88 |

FIG. 30A
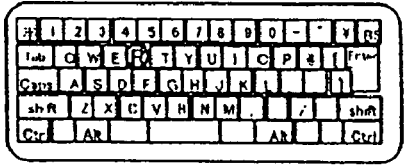 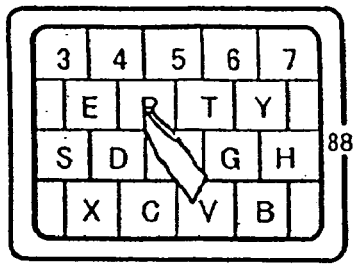
| Panel Element | Allocated Area |
|---|---|
| 3 | 1 |
| 4 | 2 |
| ⋮ | ⋮ |
| B | 21 |
| Scroll | 88 |
FIG. 30B
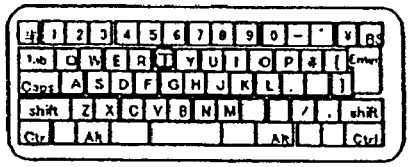 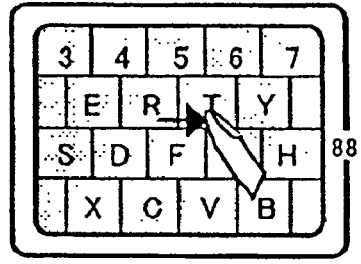
| Panel Element | Allocated Area |
|---|---|
| 3 | 1 |
| 4 | 2 |
| ⋮ | ⋮ |
| B | 21 |
| Scroll | 88 |
FIG. 30C
 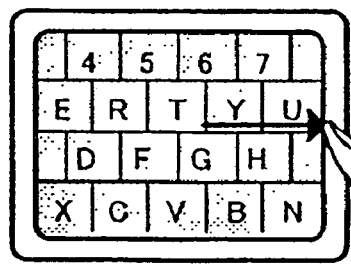
| Panel Element | Allocated Area |
|---|---|
| 4 | 2 |
| 5 | 3 |
| ⋮ | ⋮ |
| N | 22 |
| Scroll | 88 |
FIG. 30D
 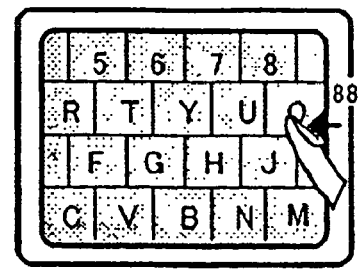
| Panel Element | Allocated Area |
|---|---|
| 4 | 1 |
| 5 | 2 |
| ⋮ | ⋮ |
| M | 22 |
| Scroll | 88 |

FIG. 34

| ID | Date | Time | Channel | Genre | Title | Performer | Contents |
|---|---|---|---|---|---|---|---|
| EPG1 | XXXXX | 21:00-22:57 | 4 | XXXXX | XXXXXX | XXXXXX | XXXX |
| EPG2 | XXXXX | 21:00-21:52 | 8 | XXXXX | XXXXXX | XXXXXX | XXXX |
| EPG3 | XXXXX | 21:00-21:30 | 1 | XXXXX | XXXXXX | XXXXXX | . |
| EPG4 | XXXXX | 21:00-21:53 | 12 | XXXXX | XXXXXX | XXXXXX | . |
| EPG5 | XXXXX | 21:00-22:51 | 10 | XXXXX | XXXXXX | XXXXXX | . |
| EPG6 | XXXXX | 21:00-23:27 | 6 | XXXXX | XXXXXX | XXXXXX | . |
| EPG7 | XXXXX | 21:00-21:45 | 3 | XXXXX | XXXXXX | XXXXXX | . |
| EPG8 | XXXXX | 21:45-2:00 | 3 | XXXXX | XXXXXX | XXXXXX | . |
| EPG9 | XXXXX | 21:52-21:57 | 8 | XXXXX | XXXXXX | XXXXXX | . |
| EPG10 | XXXXX | 21:53-21:59 | 12 | XXXXX | XXXXXX | XXXXXX | . |
| . | . | . | . | . | . | . | . |
| . | . | . | . | . | . | . | . |
| . | . | . | . | . | . | . | . |

FIG. 35

| PID1 | Size, Bitmap, Position | Corresponding EPG No. |
|---|---|---|
| 1 | xxxx, xxxx, xxxx | EPG1 |
| 2 | xxxx, xxxx, xxxx | EPG2 |
| 3 | xxxx, xxxx, xxxx | EPG3 |
| 4 | xxxx, xxxx, xxxx | EPG4 |
| . | . | . |
| n | xxxx, xxxx, xxxx | EPGn |

Track pad  Operational Area

| Date | | 1CH | 2CH | 3CH | 4CH | 5CH | 6CH |
|---|---|---|---|---|---|---|---|
| 5/15 | 14 | | | | | | |
| | 15 | | | | | | |
| | 16 | | | | | | |
| | 17 | | | | | | |
| | 18 | | | | | | |
| | 19 | | | | | | |
| | 20 | | | PGM-U | | | |
| | 21 | | | | | | |
| | 22 | | | | | | |
| | 23 | | | | | | |
| 5/16 | 0 | | | | | | |
| | 1 | PGM-L | | PGM-C | | PGM-R | |
| | 2 | | | | | | |
| | 3 | | | | | | |
| | 4 | | | | | | |
| | 5 | | | | | | |
| | 6 | | | PGM-D | | | |
| | 7 | | | | | | |
| | 8 | | | | | | |
| | 9 | | | PGM-FD1 | | | |
| | 10 | | | | | | |

Track pad Operational Area

Operational Area

Scroll Area

| Date | | 1CH | 2CH | 3CH | 4CH | 5CH | 6CH |
|---|---|---|---|---|---|---|---|
| 5/15 | 18 | | | | | | |
| | 19 | | | | | | |
| | 20 | | | PGM-U | | | |
| | 21 | | | | | | |
| | 22 | | | | | | |
| | 23 | | | | | | |
| 5/16 | 0 | | | | | | |
| | 1 | PGM-L | | PGM-C | | PGM-R | |
| | 2 | | | | | | |
| | 3 | | | | | | |
| | 4 | | | | | | |
| | 5 | | | | | | |
| | 6 | | | | | | |
| | 7 | | | | | | |
| | 8 | | | | | | |
| | 9 | | | PGM-FD1 | | | |
| | 10 | | | | | | |
| | 11 | | | | | | |
| | 12 | | | PGM-FD2 | | | |
| | 13 | | | PGM-FD3 | | | |
| | 14 | | | | | | |

Track pad Operational Area

Operational Area

Scroll Area

REMOTE CONTROL DEVICE

This application is a continuation of application Ser. No. 10/443,953, filed May 23, 2003, now allowed, the contents of which are incorporated by reference herein.

BACKGROUND OF THE INVENTION

1. Field of the Invention

The present invention relates to a remote control device which utilizes a track pad as one of the pointing devices.

2. Brief Description of the Related Art

Remote control operations by a remote control device shown in FIG. 41 have been widely performed, when electronic apparatuses equipped with display devices such as a TV set and the like are operated by utilizing the remote control device.

Recently a system in which a TV set, a VTR set, a stereophonic set and the like are mutually connected via a network interface prescribed by IEEE1394 and they are controlled by a remote control system equipped in the TV set, is proposed. In the above-mentioned system, operating panels of other sets not equipped with display units, are displayed on a display unit of the TV set.

In the above-mentioned system it is necessary to control operations of a plurality of sets by one remote control device attached to a control unit such as the TV set or the like.

In this case the remote control device shown in FIG. 41 is widely employed as a means for operating various sets having different functions simply and uniformly. A desired operation is selected such that a cursor is moved by up/down or left/right moving keys of the remote control device and the selected operation is executed by an execution key of the remote control device, which is a usual operating steps by the conventional remote control device.

However, since several pushing operations of the cursors are required before selecting the desired operation in the above-mentioned remote control device, a considerable time is required for selecting steps so that a good maneuverability can not be attained.

A remote control device, which employs a track pad capable of inputting on position data and selecting a desired key by tracing a finger on the track pad, is proposed so as to solve the above-mentioned drawbacks.

However, since the above-mentioned remote control device can not identify a currently connected set (an operational panel to be displayed) and a proper operational method and when shapes of the operational panel to be displayed and the track pad are different, there remain the following drawbacks to be solved.

a) A positional relation between the track pad and the operating panel is not clear.

b) When a whole area of the track pad is allocated to the operational panel, operational feelings differ in up/down direction and left/right direction.

c) When a numeric panel for selecting a TV channel and a full key board panel are spread on a track pad with the same size, moving speeds of keys on the respective operational panels corresponding to a moving speed of the finger are quite different, particularly the moving speed of the full key board panel is too fast to operate so that a maneuverability of the track pad is poor.

Although Japanese laid open patent No. 10-11288 proposes a remote control method utilizing the track pad, it is not such an invention capable of solving the above-mentioned drawbacks.

SUMMARY OF THE INVENTION

An object of the present invention is to overcome the above-described drawbacks.

Another objet of the present invention is to provide a remote control device capable of attaining more intuitive and easier operations than in conventional remote control devices.

A remote control device, as one of the preferred embodiments by the present inventions, is a device having a track pad unit, an operational panel for remote-controlling an electronics device and a control means for controlling the operational panel in accordance with position data acquired by the track pad unit.

Still other objects, features and advantages of the present invention will become fully apparent from the following detailed description of the preferred embodiments.

BRIEF DESCRIPTION OF THE DRAWINGS

FIG. 7 is a schematic sectional view showing an arrangement of a track pad portion of the remote control in embodiments by the present invention.

FIG. 8 is a table showing a constitution of an operational panel in embodiments by the present embodiments.

FIG. 9 is a relational table between the operational panel and the track pad in embodiments by the present invention.

FIG. 10 shows a screen of the TV set where an image and an icon of a connected device set are displayed in embodiment 1.

FIG. 11 shows the screen of the TV set where a TV channel selecting panel is displayed in embodiment 1.

FIG. 12 is a table showing a constitution of the TV channel selecting panel in embodiments by the present invention.

FIGS. 13S, A, B and C show operational steps on the TV channel selecting panel in embodiment 1.

FIG. 14 shows the screen of the TV set immediately after a TV channel is selected in embodiment 1.

FIG. 15 shows the screen of the TV set where a VTR set operational panel is displayed in embodiment 1.

FIG. 16 is a table showing a constitution of the VTR set operational panel in embodiment 1.

FIGS. 17M, N, P and Q show operational steps on the VTR set operational panel in embodiment 1 (part 1).

FIGS. 18 R, S and T show operational steps on the VTR set operational panel in embodiment 1 (part 2).

FIG. 19 shows the screen of the TV set immediately after a replay button of the VTR operational panel is pushed in embodiment 1.

FIGS. 20F, G, H and J show an initial and transitional statuses of the track pad when an operational panel having a deformed shape is allocated in Embodiment 2.

FIG. 22 shows the screen of the TV set where the VTR set operational panel is displayed in embodiment 3.

FIGS. 23U, V and W show operational steps for the VTR set in embodiment 3.

FIG. 24 shows the screen of the TV set where an image and an icon of a connected device set are displayed in embodiment 4.

FIGS. 25A, B and C are views for explaining an allocated relation between the TV channel selecting panel and the track pad in embodiment 4.

FIG. 27 is a table showing a constitution of the keyboard operational panel in embodiment 4.

FIGS. 28A, B and C are views for explaining statuses where keyboard operational panel is partially allocated on the track pad in embodiment 4.

FIGS. 29A, B and C are views for explaining operational statuses of the keyboard operational panel in embodiment 4 (part 1).

FIGS. 30A, B, C and D are views for explaining operational statuses of the keyboard operational panel in embodiment 4 (part 2).

FIG. 34 is a table showing a constitution of EPG data in embodiment 5.

FIG. 35 shows a displayed example of the EPG in embodiment 5.

DETAILED DESCRIPTION OF THE PREFERRED EMBODIMENTS

Embodiment 1

Hereinafter embodiment 1 by the present invention is explained as referring to drawings.

Figure 1:
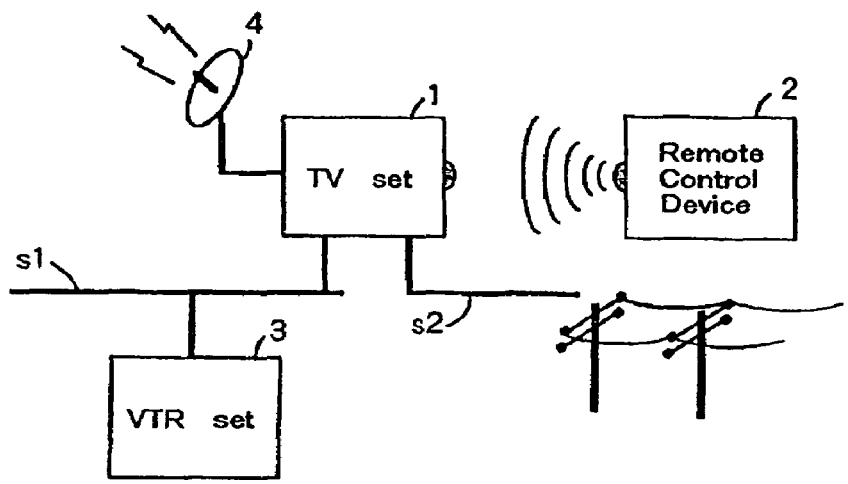
FIG. 1 is a block diagram showing a main arrangement of an operational control system in embodiment 1.

FIG. 1 is the block diagram showing the whole operational control system in embodiment 1.

A reference numeral "1" is a TV set for receiving TV broadcast, for transmitting/receiving remote control signals and data to/from device sets connected to the network and for controlling the connected device sets and the like. Further the TV set 1 displays received TV image data, images of device sets, various icons, control information and the like.

A reference numeral "2" is a remote control device for controlling and operating the TV set 1, a VTR set 3 and the like by a TV viewer. The VTR set 3 records and replays TV programs and other video and audio data.

The VTR set 3 can record and read out device information data for operating the VTR set 3 and these data can be inputted and outputted via a TV receiver arranged in the VTR set 3 and a network s1 which will be explained below.

The network s1 is connected to TV set 1 and VTR set 3 for transmitting/receiving data and a network based on the IEEE 1394 standard is employed as the network sl in accordance with a representative embodiment.

The network s1 is connected to TV set 1 and VTR set 3 for transmitting/receiving data and a network based on the IEEE 1394 standard is employed as the network s1 in the present invention.

A Reference character "s2" is a telephone line for connecting the system to external devices via TV set 1.

Figure 2:
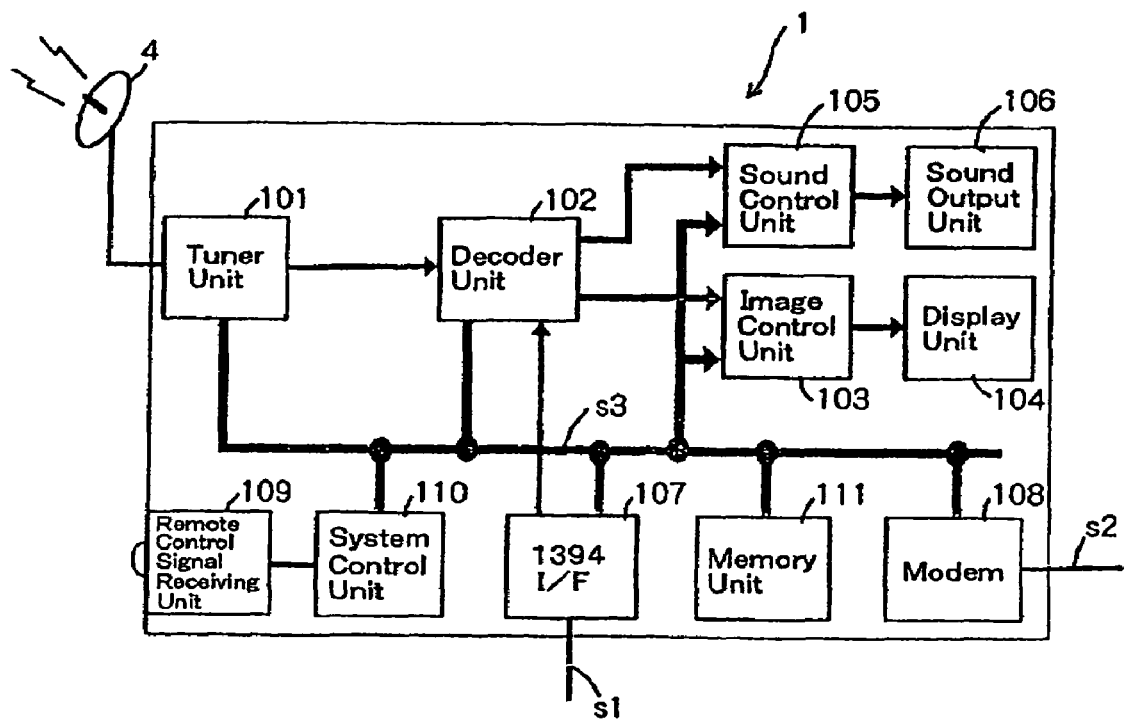
FIG. 2 is a block diagram showing an arrangement of a TV set in embodiment 1.

FIG. 2 is the block diagram showing the arrangement of the TV set 1.

A reference numeral "4" is an antenna unit for high frequency electrical signals which are transmitted to a tuner unit 101.

The tuner unit 101 amplifies the received high frequency TV signals from the antenna unit 4, selects a desired TV station, demodulates the modulated high frequency TV signals by a carrier wave and transforms the demodulated TV signals into digital stream (hereinafter referred as TS (Transport Stream)) data.

A reference numeral "102" is a decoder unit for selecting a desired program TS data among the above-mentioned TS data, for separating additional data such as charged account (hereinafter referred as CA) data, electronic program guide (hereinafter referred as EPG) data and the like and for decoding the selected TS data. Sound data decoded from the TS data is transmitted to a sound control unit 105, image data is transmitted to an image control unit 103 and other data are outputted to a bus s3 if necessary.

Video signals outputted from the tuner unit 101 are inputted to the decoder unit 102 and separated into brightness signals, color signals, audio signals and remaining other data and digitized thereon. The digitized brightness signals and color signals are transmitted to the image control unit 103, the digitized sound data are transmitted to the sound control unit 105 and the remaining other data are outputted to the bus s3.

The image control unit 103 selects or combine the image data from the decoder unit 102 and image data transmitted via the bus s3 and outputs these data to a display unit 104 in forms of digital RGB image data, horizontally and vertically synchronized signals.

The inputted digital RGB data, horizontally and vertically synchronized signals are displayed on the display unit 104 as an image. A dot-matrix display with a vertical resolution of 1080 or more and a horizontal resolution of 1920 or more is employed as the display unit in accordance with a representative embodiment.

The sound control unit 105 selects or combine sound data from the decoder unit 102 and the internal bus s3 and controls volume, quality, presence and the like of the selected or combined sound data, which are outputted to a sound output unit 106.

The sound output unit 106 converts the inputted digital sound data from the sound control unit 105 to analog signals, which are amplified and outputted from a loud speaker unit.

A reference numeral "107" is a 1394 I/F based on the IEEE1394 standard. The 1394 I/F controls and administers a high speed serial I/F, and exchanges data between the TV set 1 and VTR set 3 via the bus s1.

A reference numeral "108" is a modem used for exchanging data between TV set 1 and external device sets via the telephone line s2. For example, the modem 108 is used for transmitting audience information to an administrative server to charge accounts to audiences and for connecting the TV set 1 to Internet providers.

A reference numeral "109" is a remote control signal receiving unit, which receives data from the remote control device operated by a TV viewer and transmits the received data to a system control unit 110.

The system control unit 110 controls the whole units connected to the bus s3 in the TV set 1.

When a viewer select a TV program, the antenna unit 4, the tuner unit 101 and the decoder unit 102 are controlled by the system control unit 110 for selecting a TV channel and for controlling the CA and EPG data.

The image control unit 103 is also controlled by the system control unit 110 so as to control data from the decoder unit 102, images from the VTR set 3, icons and various information for displaying on the screen of the TV set 1.

In the same way, the sound control unit 105 is controlled so as to synthesize sounds and control outputting sounds.

The system control unit 110 also controls the 1394I/F 107 so that the VTR set 3 connected to the network s1 is controlled for exchanging data via the network s1.

The system control unit 110 controls not always the unit mentioned above according to a status of the TV set 1 and information from the 1394I/F 107 and from the modem 108, but also analyzes key code data from the remote control signal receiving unit 109 and controls various units according to the analyzed key code data.

The system control unit 110 also decides whether the operational panel displayed in the display unit 104 is in a moving state, in a touched state by a finger or in a pressed state for execution according to position data of the track pad and pressure data on the track pad for controlling various units according to the decided state.

The bus s3 is an internal bus arranged inside the TV set 1 functioning as a data exchange and control bus used for transmitting image data, sound data and information data on various units.

A memory unit 111 is a buffer memory to store inputted data and information via the internal bus s3 temporally such as additional data on a digital TV program such as the EPG data, control information generated in the TV set 1 and various information inputted from the 1394I/F 107 and the modem 108.

Figure 3:
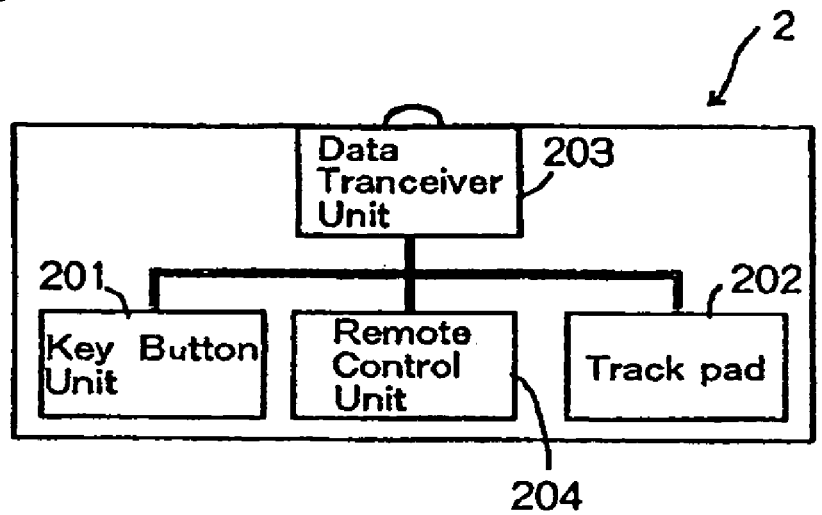
FIG. 3 is a block diagram showing a main arrangement of a remote control device in embodiment 1.
Figure 5:
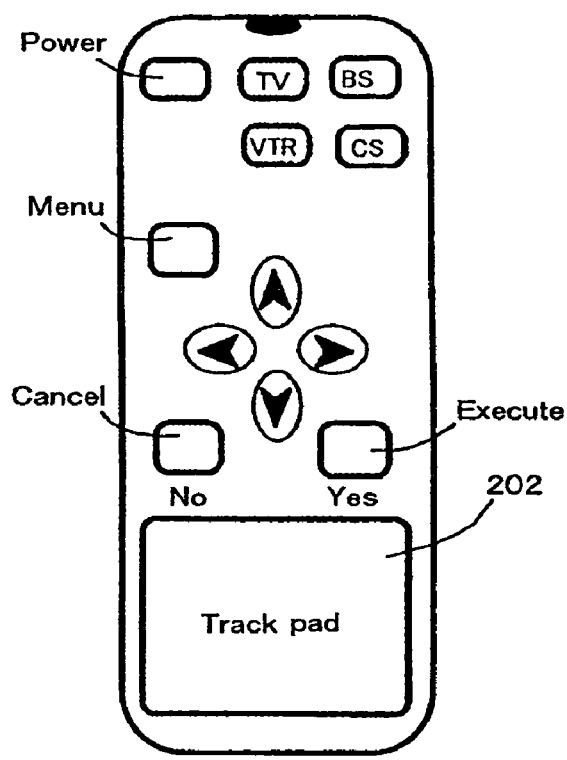
FIG. 5 is a view showing one example of the remote control devices in embodiments by the present invention.

FIG. 3 is the block diagram showing the main arrangement of the remote control device. FIG. 5 shows an appearance of the remote control device.

A reference numeral "201" in FIG. 3 is a key button unit, from which a viewer selects a key for executing a desired operation.

A power key depicted at an upper left position in FIG. 5 is used for switching on/off a power source of the remote control device. TV, BS, VTR and CS keys depicted at the right side of the power key are keys for displaying operational menus of respective inputting sources. When the VTR key is pressed without connecting the VTR set 3 to the TV set 1, a warning message is displayed in the screen of the TV set 1. A menu key positioned below the power key is used for various settings in the TV set 1 and displaying an operational menu. One of the menu items in the operational menu is decided or changed by cursor keys, an execution key or a cancel key positioned below the menu key.

A reference numeral "202" is a track pad having a rectangular shape as shown at the bottom of FIG. 5. The track pad is touched, moved as being touched or pressed by a finger so as to operate the TV set 1 and the like.

The track pad 202 has a structure shown in FIG. 7 such that X electrodes and Y electrodes made of pressure sensitive elements, are arranged perpendicularly each other so as to form a lattice structure, over which a cover sheet is spread. A remote control unit 204 scans the lattice made of X and Y electrodes and detects voltage changes so that positions touched by a finger are detected.

A reference numeral "203" is a data transceiver unit, which transmits key data and position data of the track pad to the remote control signal receiving unit 109 in the TV set 1 and so forth.

The remote control unit 204 scans the key button unit 201, detects a pressed key, encodes a key code of the detected key, transmits the key code to the TV set 1 and receives a response and the like from the TV set 1.

As mentioned above, the remote control unit 204 scan the track pad 202, detects whether the track pad is pressed or not and whether a pressure on the track pad is changed or not, and outputs corresponding position data and pressure data via the data transceiver unit 203.

Figure 4:
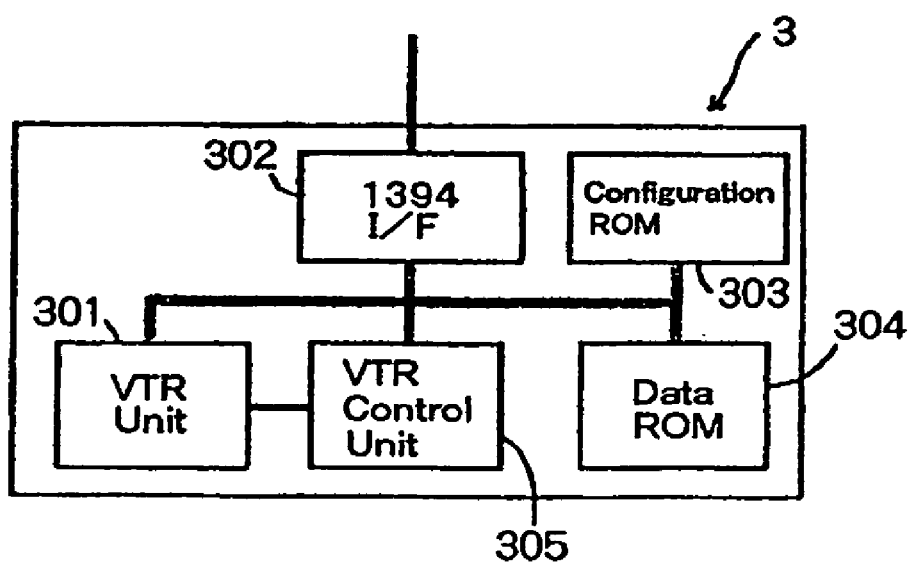
FIG. 4 is a block diagram showing a main arrangement of a VTR set in embodiment 1.

FIG. 4 is the block diagram showing the main arrangement of a digital tape recorder (hereinafter referred as VTR) equipped with the 1394I/F.

A reference numeral "301" is a VTR unit such as a video camcorder comprising a video tape running mechanism, a video tape running control unit, a video signal demodulating and modulating unit and various conversion units, which are controlled by a VTR control unit 305.

A reference numeral "302" is a 1394I/F similar to the above-mentioned 1394I/F 107, which controls the bus s1 and data exchanges in the VTR set 3.

A reference numeral "303" is a configuration ROM in which data proper to the VTR set such as a manufacturer of the VTR set, a VTR set name, a type, a manufacturing number, a manufactured date, version data of software in the VTR control unit 305, category data and the like.

A reference numeral "304" is a data ROM in which operational panel data are stored for displaying information on operational statues of the VTR set 3 on the screen of the TV set 1 via the bus s1.

The VTR control unit 305 controls the VTR unit 301 based on VTR control information transmitted via the bus s1 and the 1394I/F 302, and reads out displayed data on the operational panel from the data ROM 304 according to a controlling status and transmits the read out data to the TV set 1 via the 1394I/F and the bus s1.

Hereinafter a structure of the operational panel in accordance with a representative embodiment is explained.

The constitution of the operational panel is shown in FIG. 8.

Data displayed as the operational panel on the screen of the TV set 1 are a set of elements displayed as operational circumstances. Every element has its proper ID.

A panel element is a set of elements of the operational panel and holds a row of element IDs included in the panel.

The panel element also can hold data on a panel size bit map of a panel background and the like.

A button element can be pressed or released by a user via the remote control device and holds bit map data, positions, sizes and the like when pressed and released statuses respectively.

The button element also holds operating data at a time when the track pad is pressed or released.

An icon element displays a bit map and can be selected by a user. It holds bit map data, position, size and the like. The icon element also holds operating data at a time when the icon is selected.

A text element displays a title and an explanation in character lines and holds data on position and size, text data used as a label, background color data, font data and the like.

The above-mentioned position means a relative position specified by pixels in a panel element to which each element belongs.

Hereinafter operations by using the track pad are explained.

A relational table between the operational panel and the track pad shown in FIG. 9 is prepared in the TV set 1 and the system control unit 110 respectively so as to relate touched positions to corresponding elements of the operational panel.

The relational table indicates corresponding areas in the track pad 202 allocated to the operational panel and respective elements. A new relational table corresponding to a newly activated operational panel is generated every time when the new operational panel is activated and replaced with the former relational table.

Corresponding operations to respective elements in the operational panel and a focusing operation (which will be explained below) are executed in accordance with the above-mentioned relational table, when the track pad is touched, pressed or released by a user.

Hereinafter operational steps are explained.

FIG. 10 shows a displayed image in the screen of the TV set 1 in the system shown in FIG. 1. The displayed image (illustrating a man and a car) is an image from a TV program from channel 1 indicated at a lower left corner in FIG. 10 and a VTR icon is displayed at a lower right corner in FIG. 10 indicating that the connected VTR set 3 is switched on.

The VTR icon is not displayed when the VTR set 3 is switched off.

Hereinafter operations for selecting TV channels in a case when a shape of the track pad is similar to a shape of the operational panel.

Figure 21:
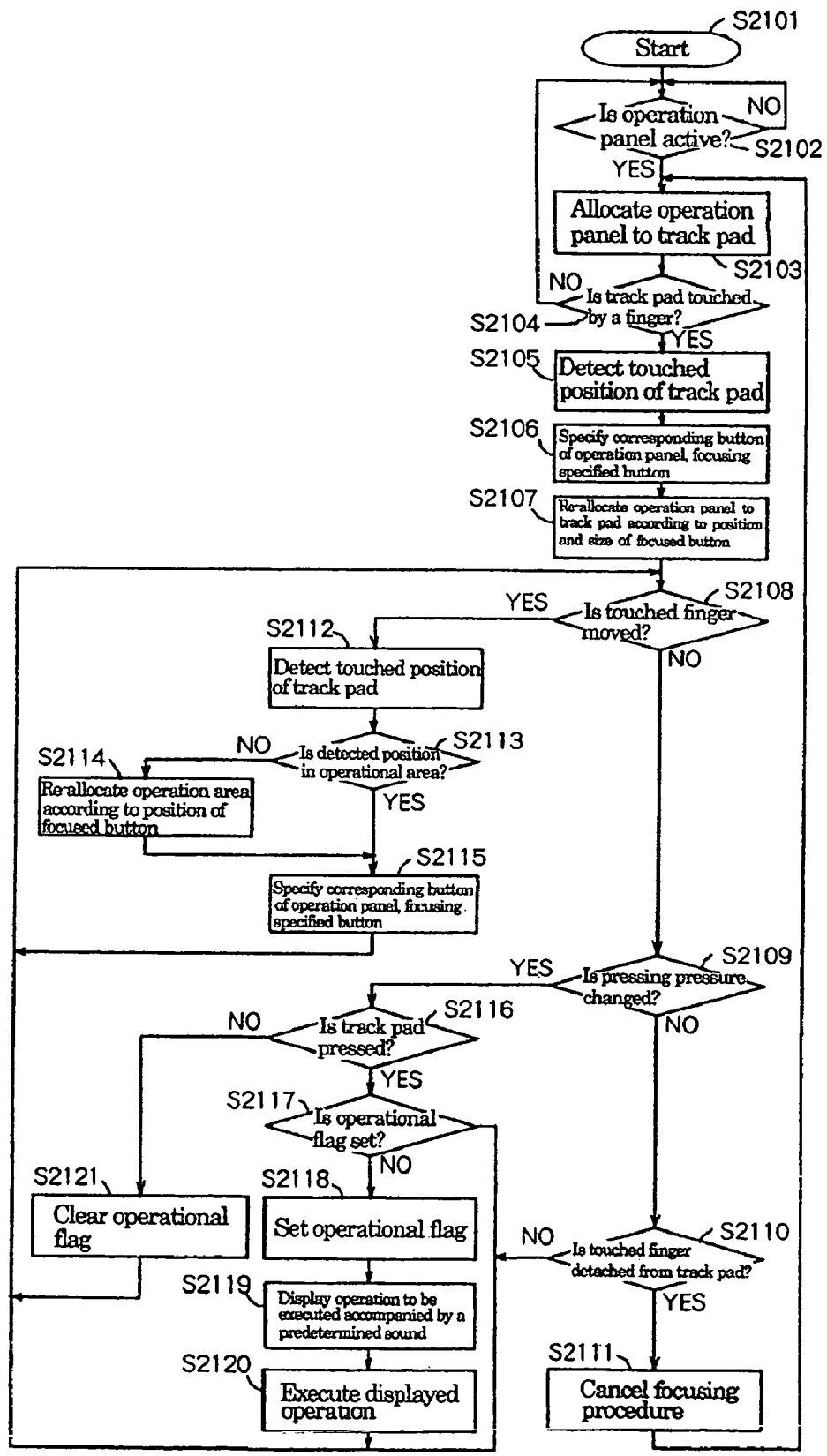
FIG. 21 is a flow chart showing operational steps of an operational panel control routine.

FIG. 21 is the flowchart showing operating steps of the operational panel controlled by the operational panel control routine.

A first case when a TV viewer selects a TV channel is explained.

When the TV button of the remote control device in FIG. 5 is pressed, the corresponding key data to the pressed key is transmitted from the remote control device 2, and received by the remote control signal receiving unit 109 of the TV set 1.

When the system control unit 110 of the TV set 1 detects the received key data, a TV channel selecting panel is read out from the memory unit 111 and outputted to the image control unit 3. The image control unit 3 activates the corresponding operational panel and indicates to display a synthesized image in the display unit 104.

FIG. 11 shows the screen of the TV set at a time when the TV channel selecting panel is displayed.

The TV channel selecting panel consists of 12 numeric buttons from 1 to 12 arranged in a matrix with 4 lines by 3 rows. Position data of respective numeric buttons are related to the above-mentioned matrix.

The table in FIG. 12 shows the constitution of the TV channel selecting panel.

Figure 6:
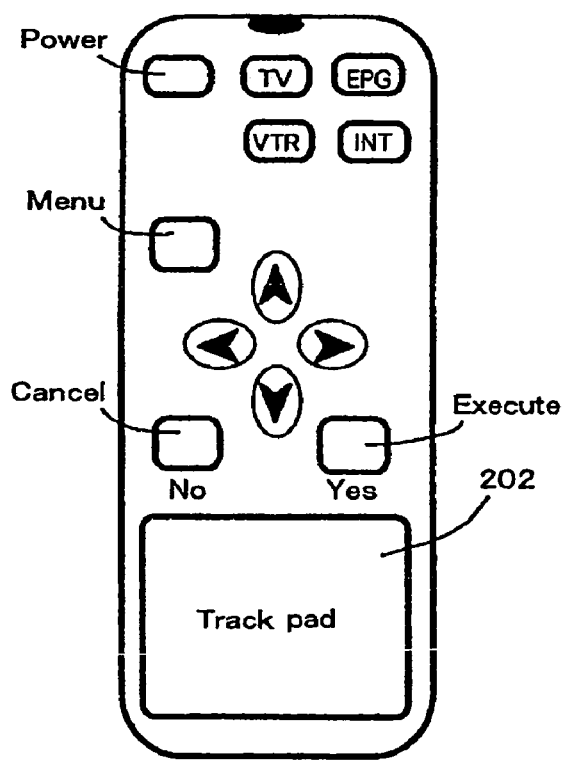
FIG. 6 is a view showing another example of the remote control devices in embodiments by the present invention.

The shape of the TV channel selecting panel is similar to the shape of the track pad shown in FIG. 5 or FIG. 6.

Hereinafter operational steps are explained as referring to FIG. 21. The operational panel control routine in the system control unit 110 watches whether the operational panel is activated or not (step S2102). When the operational panel control routine detects that the operational panel is activated, a relational table between the operational panel and the track pad is generated according to position data of respective elements in the TV channel selecting panel so as to divide the track pad into the matrix with 4 lines by 3 rows consisting of area A to area L as shown in FIG. 13S. Thus areas A to L in the track pad can be corresponded to buttons in the operational panel (step S2103).

The operational panel control routine watches whether the track pad is touched by a finger or not (step S2104).

When the track pad is touched by the finger, touched pressure data and touched position data from the remote control device 2 are received by the remote control signal receiving unit 109. The operational panel control routine in the system control unit 110 detects the touched position of the track pad based on the received position data and determines a corresponding button of the operational panel based on the relational table between the operational panel and the track pad (step S2105).

The button corresponding to the touched position is changed in its color and its character display (hereinafter referred as focusing) in order to let a TV viewer recognize the corresponding button is selected. Thus the operator can confirm the focussed button in the operational panel (step S2106).

The changed color and character display are returned to the previous statuses, when the finger is released from the track pad.

When the finger touches position A in FIG. 13S, button "3" in the operational panel is focused as shown in FIG. 13A. In the same way button "10" is focused when the finger touches position B as shown in FIG. 13B.

Buttons in the operational panel are re-allocated to the track pad based on the touched position so as to utilize the track pad area as large as possible by keeping the similar shape relation between the operational panel and the track pad as before (step S2107).

Since the shapes of the operational panel and the track pad are similar in the present embodiment, re-allocated relations between buttons of the operational panel and areas of the track pad are kept the same relations as in Step S2103. Consequently, the whole area of the track pad correspond to the operational panel and the relational table between the operational panel and the track pad is not changed.

The re-allocating step is executed only when the track pad is touched firstly, but not executed as far as the finger in not released from the track pad.

The operational panel control routine watches touched pressure data and touched position data received from the remote control device 2 so as to detect whether the touching finger is moved, presses a button, released or kept its position as it is (steps S2108, S2109 and S2110).

When the operational panel control routine decides touching finger is moved, a currently touched position of the track pad is detected based on position data (step S2112).

The currently touched position is judged whether it is in an operational area of the re-allocated TV channel selecting panel on the track pad or not, based on the relational table between the operational panel and the track pad (step S2113). When the touched position is judged to be out of the operational area, the operational panel is re-allocated (step S2114).

As mentioned above, since the TV channel selecting panel is allocated to the whole area of the track pad, the re-allocation steps are not required in the present embodiment.

When the touched position is judged in the operational area, the corresponding button is confirmed and then focused.

When the finger is moved from position B to position C as shown in FIG. 13C as the track pad is kept being touched, the finger moves from area J via area K to area L of the track pad.

Consequently, a focused button in the TV selecting panel is moved from button 10 via button 11 and finally to button 12 as shown in FIG. 13C (step S2115).

Since shapes of the TV channel selecting panel and the track pad are similar each other, a required moving distance of the finger in the track pad is the same in horizontal and vertical directions for moving the focused button in the operating panel by a unit distance.

When a pressure change on the track pad is detected, a status is judged whether the finger is pressing downward or releasing (step S2116). When the focused button is decided to be pressed, the operational panel control routine judges whether an operational flag is set or not (step S2117).

If the operational flag is set, the operational panel control routine judges a necessary order to execute an operational step corresponding to the pressed button was already delivered. The operational panel control routine returns to step S2108 so as to continue watching touched pressure data and touched position data received from the remote control device 2.

If the operational flag is not set yet, it is set (step S2118). In this stage, since the operation corresponding to the pressed button is not executed yet, color and character display of the pressed button are further changed (in FIG. 14 the pressed button is surrounded by a fringed frame) for a predetermined period so as to recognize the TV viewer that the operation should be executed. At the same time, a recognition sound is outputted to the sound control unit 105 to generate the sound (step S2119) and a corresponding execution order is transmitted to the system control unit 110 (step S2120).

Then the operational panel control routine returns to step S2108 so as to continue watching touched pressure data and touched position data received from the remote control device 2.

When the pressure change is decided that the finger is pressing downward, the operational flag is cleared (step S2121), and the operational panel control routine returns to step S2108 so as to continue watching data touched pressure data and touched position data received from the remote control device 2.

When the pressure change is decided that the finger is released (step S2110), the focusing operation in the operational panel is stopped (step S2111), and the operational panel control routine returns to step S2103 so as to allocate the whole area of the track pad to the operational panel area.

When the pressure change is decided that the finger touches the same position on the track pad, the operational panel control routine returns to step S2108 so as to continue watching data on touched pressure data and touched position data received from the remote control device 2.

As described above, a desired TV channel can be selected as the finger being touched, moved and pressed on the track pad.

FIG. 14 shows a moment when the TV channel has changed from channel 1 to channel 12 by pressing track pad as shown in FIG. 13C. Immediately after button 12 is pressed, a smooth oval circle surrounding button 12 is changed to fringed oval circle.

Hereinafter a new operational panel for the VTR set 3, which is longer than the TV channel selecting panel in its horizontal direction.

Firstly a TV viewer recognizes the VTR icon as shown at the lower left corner of FIG. 10 which indicates the VTR set 3 is connected to the TV set 1. Then the TV viewer presses the VTR button of the remote control device shown in FIG. 5 so that corresponding key data to the VTR button to are transmitted to the remote control signal receiving unit 109 in the TV set 1.

When the system control unit 110 in the TV set 1 detects the received key data, the system control unit 110 controls the 1394I/F 107 to instruct the VTR set 3 to transmit a VTR operational panel.

The VTR set 3 transmits the VTR operational panel to the TV set 1 according to the instruction.

The TV set 1 receives the VTR operational panel, which is stored in the memory unit 111 temporally and is also outputted to the image control unit 103. The image control unit 103 controls the display unit 104 to display the VTR operational panel as a synthesized image with a currently displayed image and activates the VTR operational.

FIG. 15 shows the display unit 104 where the VTR operational panel is displayed.

The VTR operational panel is divided into two parts, the upper and lower parts. The upper part consists of only a replay button. The lower part is divided into five buttons for recording, rewinding, stopping, fast-forwarding and temporally stopping. That is why the VTR operating panel is longer than the TV channel selecting panel in its horizontal direction.

FIG. 16 shows the constitution of the VTR operational panel.

The VTR operational panel is also operated in accordance with steps of the operational panel control routine in the flow chart shown in FIG. 21.

The operational panel control routine watches whether the operational panel is activated or not (step S2102) in the same way as the TV channel selecting panel. When the operational control routine detects that the VTR operational panel is activated, the operational panel control routine allocates the VTR operational panel to the whole area of the track pad as shown in FIG. 17M so that the track pad is divided into upper and lower parts, further the lower part is divided into 5 parts. Thus respective divided parts are related to elements of the VTR operational panel.

A relational table between the operational panel and track pad as shown in FIG. 17M, is generated.

The operational panel control routine watches whether the track pad is touched or not (step S2104).

When the track pad is touched by a finger of the TV viewer, the remote control signal receiving unit 109 receives touched pressure data and touched position data transmitted from the remote control device 2. The operational panel control routine in the system control unit 110 detects a touched position based on the received touched position data, refers to the relational table between the operational panel and the track pad and determines a corresponding button in the operational panel (step S2105).

The corresponding button is focused (step S2106).

When position N shown in FIG. 17M is touched, the "replay" button is focused as shown in FIG. 17N. When position P is touched, the "rewind" button is focused as shown in FIG. 17P and when position Q is touched, the "temporal stop" button is focused as shown in FIG. 17Q.

Buttons in the VTR operational panel are re-allocated to the track pad so as to utilize the track pad area as large as possible by keeping the relation between the VTR operational panel and the track pad as before (step S2107).

Since the VTR operational panel is long in horizontal direction compared with the track pad, operational areas in the track pad are allocated in vertically compressed states as shown in FIGS. 17M, N, P and Q.

Before the track pad is touched, the whole area of the track pad is activated as the operational area as shown in FIG. 17M.

However, once the track pad is touched on position N, P or Q, a portion of the track pad is activated as the operational area as shown in FIGS. 17N, P and Q and the relational table between the operational panel and the track pad is changed.

The track pad is re-allocated, when a finger is moved outside the operational area of the track pad.

The operational panel control routine watches the touched pressure data and the touched position data received from the remote control device 2 so as to detect whether the touching finger is moved, presses a button, released or kept its position as it is (steps S2108, S2109 and S2110).

When the operational panel control routine decides the touching finger is moved, a currently touched position of the track pad is detected based on position data (step S2112).

As shown in FIG. 18R, when the finger touching position P is moved leftward to position R as the finger kept touching the track pad, a focused button in the VTR operational panel is also shifted from the "rewind" button to the "record" button.

In the same way, when the finger touching position P is moved upward to position S as the finger kept touching the track pad, a focused button in the VTR operational panel is also shifted from the "rewind" button to the "replay" button as shown in FIG. 18S.

Since the track pad is re-allocated at step S2107 as well as the relational table between the operational panel and the track pad as the shape of the allocated area of the track pad being kept similar to the VTR operational panel, respective moving distances from position P to position R and from position P to position S can be set equal.

The operational control routine decides whether the currently touched position is in an operational area of the VTR operational panel or not based on the relational table between the operational panel and the track pad (step S2113). When decided in the operational area, the corresponding button in the VTR operational panel is focused.

When the operational panel control routine decides touched position is out of the operational area, the operational panel is re-allocated in the same way in the above-mentioned step S2107 (step S2114).

FIG. 18T corresponds to the above-mentioned status where the touched position T moved from position P is out of the operational area. In this case, if the focused button is dragged upward immediately before the touched finger is moved out of the operational area allocated at step S2107, the track pad is re-allocated such that the touched position is allocated to the replay button of the VTR operational panel.

Thus the operational control routine can handle even in a case when the touching finger is intended to move from position P (rewind) to position S (replay), but moved to position T out of the operational area.

The corresponding button in the VTR operational panel is focused (step S2115).

When a pressure change on the track pad is detected, a status is judged whether the finger is pressing downward or releasing (step S2116). When the focused button is decided to be pressed, the operational control routine decides whether an operational flag is set or not (step S2117).

If the operational flag is set, the operational panel control routine judges a necessary order to execute an operational step corresponding to the pressed button was already delivered. The operational panel control routine returns to step S2108 so as to continue watching touched pressure data and touched position data received from the remote control device 2.

If the operational flag is not set yet, it is set (step S2118). In this stage, since the operation corresponding to the pressed button is not executed, color and character display of the pressed button are further changed (a pressed button is surrounded by a fringed frame as shown in FIG. 19) for a predetermined period so that the TV viewer can recognize the operation should be executed. At the same time, a recognition sound is outputted to the sound control unit 105 to generate the sound step S2119) and a corresponding execution order is transmitted to the system control unit 110 (step S2120).

Then the operational panel control routine returns to step S2108 so as to continue watching touched pressure data and touched position data received from the remote control device 2.

When the pressure change is judged that the finger is pressing downward (step S2116), the operational flag is cleared (step S2121), and the operational panel control routine returns to step S2108 so as to continue watching pressure data and touched position data received from the remote control device 2.

When the pressure change is judged that the finger is released, the focusing operation in the operational panel is stopped (step S2111), and the operational panel control routine returns to step S2103 so as to allocate the whole area of the track pad to the operational panel area.

When the finger is judged to touch the same position on the track pad, the operational panel control routine returns to step S2108 so as to continue watching the touched pressure data and touched position data received from the remote control device 2.

As described above, a desired VTR operation can be selected as the finger being touched, moved and pressed on the track pad.

As described above, when an operational panel button is moved by the finger, moving speeds on the operational panel in horizontal and vertical directions are attained equal, even the VTR operational panel is long in the horizontal direction.

However, if the allocated track pad is kept as shown in FIG. 17M, where allocated areas are longer in the vertical direction, a short finger movement in the horizontal direction can move a focused button, while a longer finger movement is required to move the focused button in the vertical direction. As a result, finger movements on the track pad can not match visual button movements on the VTR operational panel.

Even when the finger is moved out of the allocated operational area set by step S2107, operational steps can be continued by shifting the whole operational area.

Embodiment 2

In the present embodiment, an operational area of the track pad shown in FIG. 20F, which is not similar to the shape of the track pad as in embodiment 1 and is not rectangular in its shape, is explained.

As described in Embodiment 1, when a rectangular operational panel is related to the track pad, the finger is not moved out of the operational area, even if the finger is moved to positions at ends as shown in FIGS. 17N and Q. When the operational panel formed as shown in FIG. 20F is activated, a relational table between the operational panel and the track pad corresponding to a track pad allocation map shown in FIG. 20F is generated.

When a position G on the track pad is touched, the relational table between the operational table and the track pad is changed to a new table corresponding to a track pad allocation shown in FIG. 20G.

When the finger is moved from position G to position H as shown in FIG. 20H, the finger is moved out of the operational area because of the similarity between the operational panel and the operational area on the track pad. Then the relational table between the operational panel and the track pad is changed to a new relational table corresponding to a track pad allocation FIG. 20J.

Embodiment 3

As explained in the case of the VTR operational panel in embodiment 1, when the operational panel is not similar to the track pad, the relational table between the operational panel and the track pad is generated and changed in accordance with moved positions of the finger so as to keep the similarity between the operational panel and the operational area of the track pad. However, the operational area of the track pad may be fixed by the system control unit 110 beforehand.

The case of the fixed operational area of the track pad is explained as referring to FIGS. 22 and 23.

When the system control unit 110 detects the VTR operational panel is activated as shown in FIG. 22, based on the operational panel data the system control unit allocates the track pad as shown in FIG. 23U as keeping the similarity between the operational panel the operational area of the track pad. The allocated area of the track pad is divided into upper part and lower part, the lower part is further divided into 5 parts in a horizontal direction, which correspond to the button elements of the operational panel respectively. Remaining other parts of the track pad are kept as inactive areas.

A relational table between the operational panel and track pad as shown in FIG. 23U is generated.

Active areas and inactive areas of the track pad are displayed in the operational panel as shown in FIG. 22.

Thus a TV viewer can recognize approximate positions of active areas of the track pad.

When the TV viewer touches position V in FIG. 23U, since the position V is on the active area and corresponds to the rewind button of the operational panel, the rewind button in the operational panel is focused as shown in FIG. 23V.

When the TV viewer touches position W, since the position W is in the inactive area, a warning alarm is generated as shown in FIG. 23W.

In the above-described embodiments, the display unit arranged in the TV set is employed as a display means, but a stand alone type display means is also employable.

Embodiment 4

The present embodiment is explained as referring to drawings.

A case when a TV viewer (same as the remote control device user) selects a desired TV channel, is explained firstly.

Figure 31:
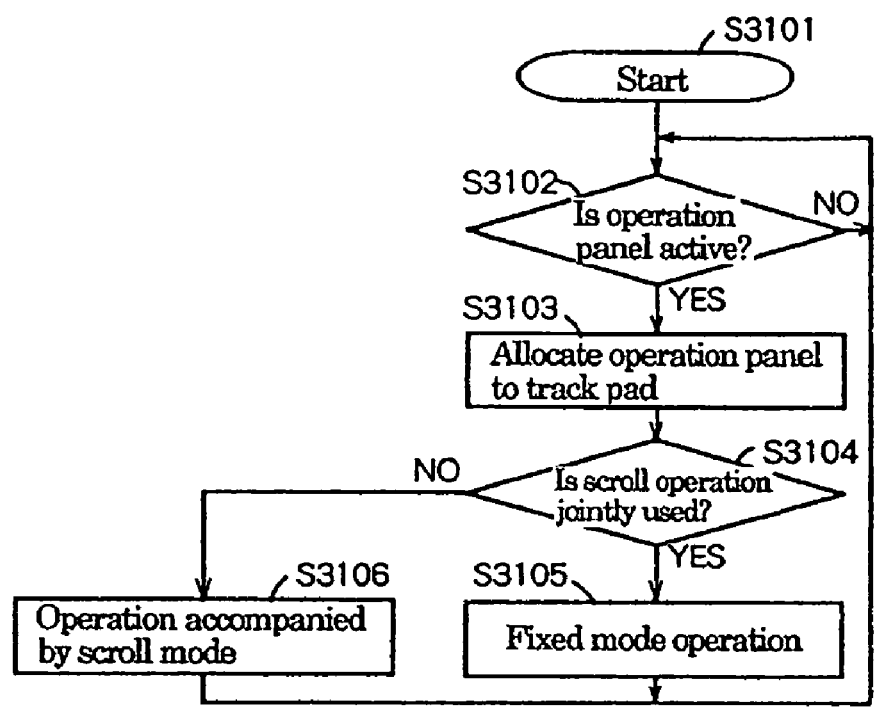
FIG. 31 is a flow chart showing control steps of the operational panel in embodiment 4 (for selecting operational modes).
Figure 32:
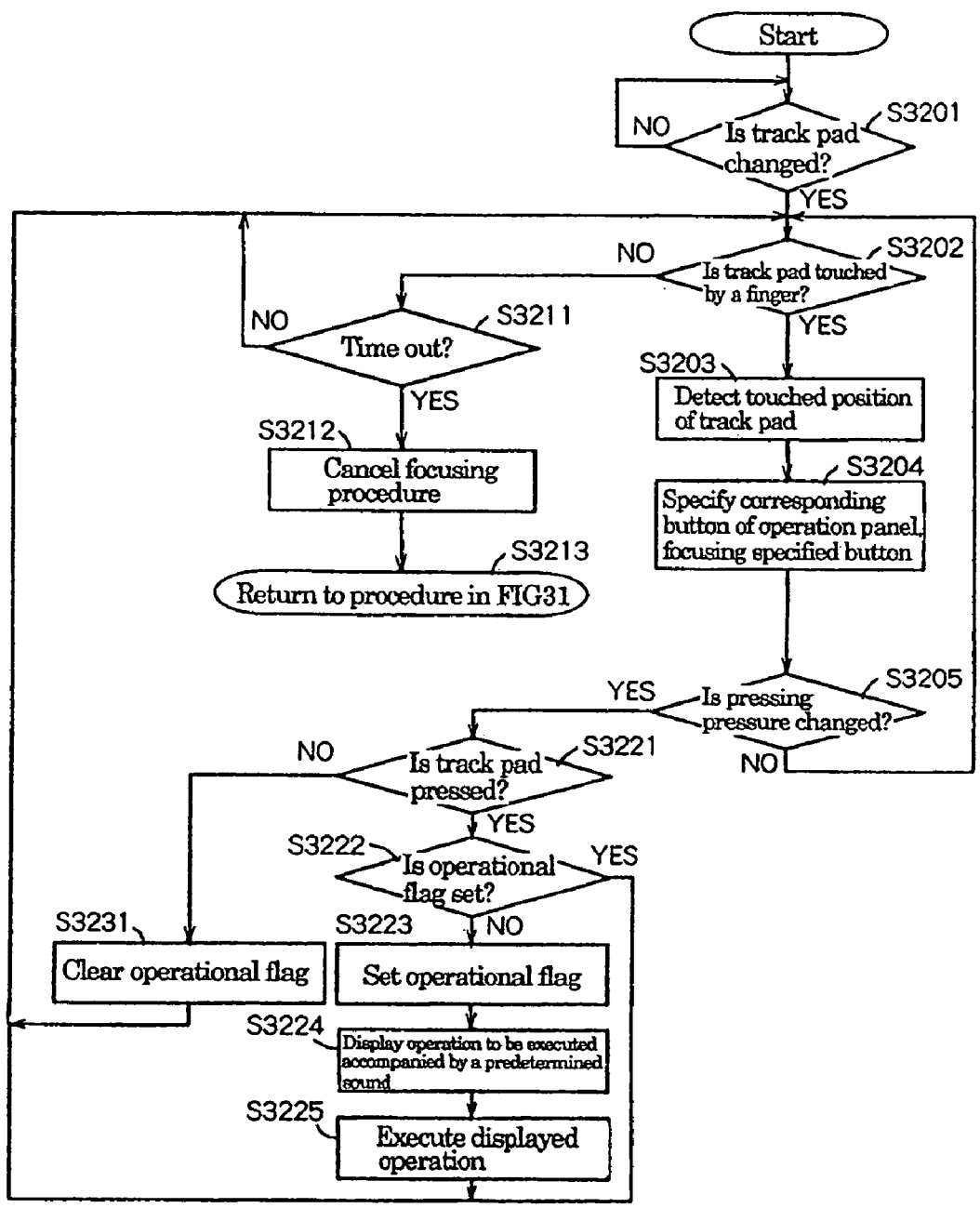
FIG. 32 is a flow chart showing control steps of the operational panel in embodiment 4 (for a fixed mode).
Figure 33:
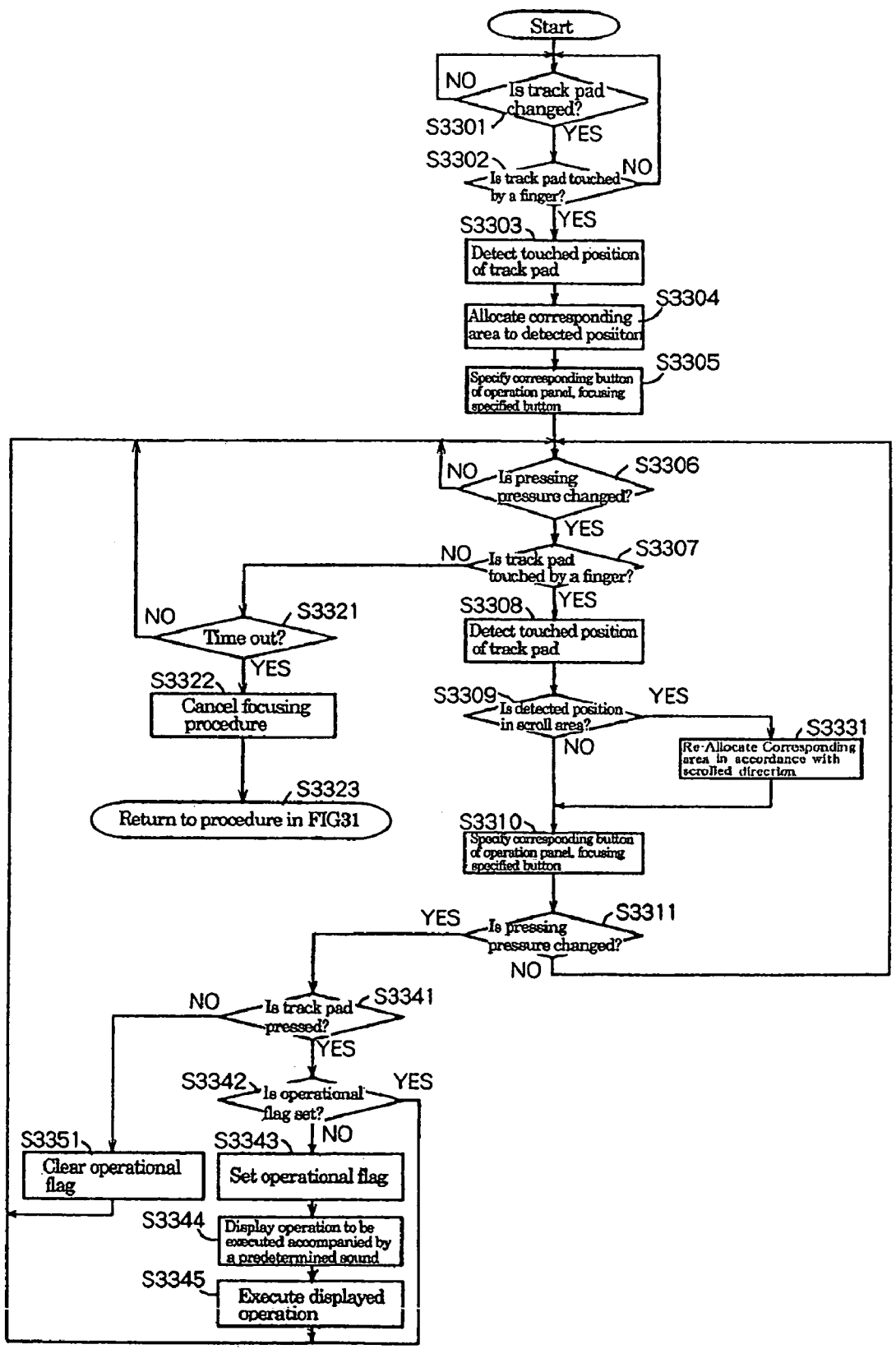
FIG. 33 is a flow chart showing control steps of the operational panel in embodiment 4 (for a scroll combined mode).

FIGS. 31 to 33 are flow charts showing control steps of the operational panel in embodiment 4.

When the TV button of the remote control device shown in FIG. 6 is pressed so as to select a desired TV channel, key data corresponding to the pressed button is transmitted from the remote control device 2 to the remote control signal receiving unit 109 in the TV set 1.

When the system control unit 110 in the TV set 1 detects the key data, the TV channel selecting panel is read out from the memory unit 111 and outputted to the image control unit 103. The image control unit 103 controls the display unit 104 to display the TV channel selecting panel as a synthesized image with a currently displayed TV image so that the TV channel selecting panel is activated.

FIG. 24 shows a displayed image in the screen of the TV set 1 in the system shown in FIG. 1. The displayed image (showing a man and a car) is an image from a TV program from channel 1 indicated at a left below corner in FIG. 24 combined with the TV channel selecting panel. A VTR icon is displayed at right below corner in FIG. 24, which indicates that the VTR set 3 is switched on.

As shown in FIGS. 25A, B and C, the TV channel selecting panel has a matrix with 3 rows and 4 lines, where numeric buttons from 1 to 12 are arranged, having the same length/width ration as the track pad.

In an operating mode selecting routine shown in FIG. 31, the operational panel control routine in the system control unit 110 watches whether the operational panel is activated or not (step S3102). When the operational panel control routine detects the TV channel selecting panel is activated, the whole area of the track pad is allocated to the TV channel selecting panel as shown in FIG. 25B based on position data of each element of the TV channel selecting panel. A relational table between the operational panel and track pad as shown in FIG. 25C is generated (step S3103).

The operational panel control routine decides a suitable mode for the track pad: a fixed mode for allocating the whole operational panel to the track pad or a mixed mode with scroll operations (step S3104).

In the present embodiment, when the operational panel has a larger matrix than a matrix with 4 rows by 5 lines, the mixed mode is selected. Since the TV channel selecting panel has the matrix with 3 rows by 4 lines, the fixed mode is employed (step S3106).

When scroll operations are necessary, the operational panel control routine selects the mixed mode (step S3105).

As shown in FIG. 32, a fixed mode routine watches whether track pad data transmitted from the remote control device are changed or not (step S3201).

When a finger of the user touches the track pad, touched pressure data and touched position data from the remote control device 2 are received by the remote control signal receiving unit 109. The operational panel control routine in the system control unit 110 detects whether the track pad is touched by the finger and the like or not (step S3202).

When the operational panel control routine confirms the track pad is touched, it detects a touched position of the track pad based on the position data (step S3203).

Based on the relational table between the operational panel and the track pad, a corresponding button of the operational panel is determined and changed its color and character display (hereinafter referred as focusing) so that the user can recognized the touched position corresponding to the selected button. Thus the user can confirm a focused element of the operational panel (step S3204).

When area 12 of the track pad shown in FIG. 25B is touched, element "12" of the operational panel is focused as shown in FIG. 24.

When the operational panel control routine decides the touching finger is released, it watches whether the track pad is touched again or not for a determined period (until a time out) (step S3211). When the track pad is touched within the time out, the operational panel control routine returns to step S3202 and continues watching touched pressure data and touched position data transmitted from the remote control device 2.

When the track pad is not touched within the predetermined period, the operational panel control routine decides the time is out, stops focusing (step S3213) and returns to step S3101 of the operating mode selecting routine shown in FIG. 31 (step S3213).

The operational panel control routine watches touched pressure data received from the remote control device 2 and detects a pressure change whether one of the TV channel selecting buttons is pressed or not (step S3205).

When the pressure change on the track pad is detected, the operational panel control routine judges whether the finger is being pressed downward or being released (step S3221). When the operational control routine decides the focused button is pressed, it judges whether an operational flag is set or not (step S3222).

If the operational flag is set, the operational panel control routine decides a necessary order to execute an operation corresponding to the pressed button is delivered. The operational panel control routine returns to step S3202 so as to continue watching touched pressure data and touched position data received from the remote control device 2.

If the operational flag is not set yet, the operational flag is set (step S3223). In this stage, since the operation corresponding to the pressed button is not executed, color and character display of the pressed button are further changed for a predetermined period so that the operator can recognize the operational step should be executed. At the same time, a recognition sound is outputted to the sound control unit 105 to generate the sound (step S3224) and a corresponding execution order is transmitted to the system control unit 110 (step S3225).

Then the operational panel control routine returns to step S3202 and continues watching touched pressure data and touched position data received from the remote control device 2.

When the operational control routine judges the finger is pressed downward based on the pressure change, the operational flag is cleared (step S3231). Then the operational panel control routine returns to step S3202 so as to continue watching touched pressure data and touched position data received from the remote control device 2.

Thus a desired TV channel can be selected by a finger which touches the track pad and is moved to a desired position and is pressed thereon.

Figure 26:
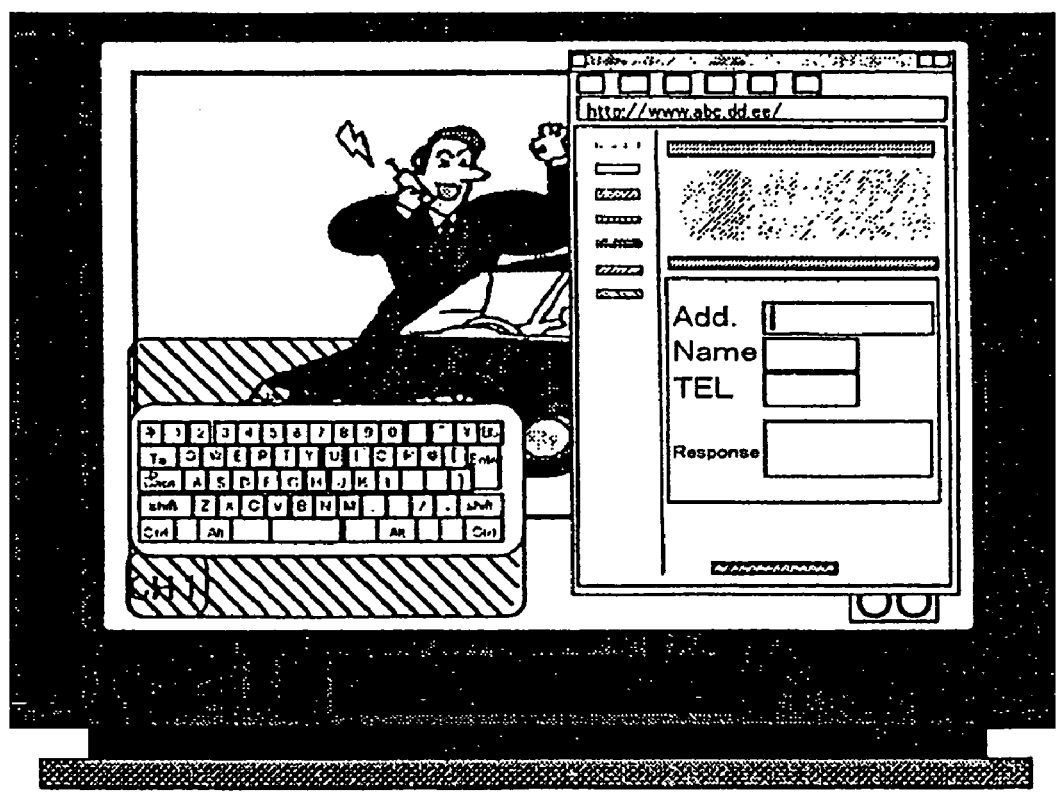
FIG. 26 shows the screen of the TV set where a keyboard operational panel is displayed in embodiment 4.

Hereinafter inputting operations by a displayed keyboard panel consisting of matrix with 5 lines by 14 to 15 rows, namely by a virtual keyboard as shown in FIG. 26, are explained.

FIG. 27 shows the constitution of the keyboard operational panel.

Operational steps by the keyboard operational panel are executed in accordance with the flow chart of the operational panel control routine shown in FIG. 31.

In the operating mode selecting routine shown in FIG. 31, the operational panel control routine in the system control unit 110 watches whether the operational panel is activated or not (step S3102) in the same way as in the TV channel selecting panel. When the operational panel control routine detects the keyboard panel is activated, a corresponding area of the track pad is divided into a matrix with 5 lines by 14 to 15 rows allocated to each key element of the keyboard panel as shown in FIG. 28B based on position data of each element of the keyboard panel. A relational table between the operational panel and track pad as shown in FIG. 28C is generated (step S3103)

Since the shape of the keyboard panel is horizontally long, inactive areas 99 are formed in the track pad as shown in FIG. 28B.

The operational panel control routine decides whether it is suitable to keep the allocated state where the whole operational panel is allocated to the track pad, or not (step S3104).

Since the keyboard panel has 14 to 15 rows, the mixed mode with scroll operations is selected (step S3105).

FIG. 33 is the flow chart showing control steps of the operational panel controlled by the mixed mode with scroll operations.

In the mixed mode, the track pad data transmitted from the remote control device are watched inside the system control unit 110 (step S3301) in the same way as in the fixed mode.

In the mixed mode with scroll operations, the operational panel control routine also watches whether the track pad is touched or not (step S3302).

When the track pad is touched by a user, touched pressure data and touched position data from the remote control device 2 are received by the remote control signal receiving unit 109. The operational panel control routine in the system control unit 110 detects whether the track pad is touched by a finger and the like or not (step S3202).

When the operational panel control routine confirms the track pad is touched, it detect a touched position of the track pad based on the relational table between the operational panel and the track pad generated at step S3103 in FIG. 31 (step S3303). Key elements consisting of 5 to 6 rows by 4 lines around a key element corresponding to the touched position on the track pad are allocated to the track pad based on touched position data. Scroll areas are set around the allocated key elements on the track pad and the relational table between the operational panel and the track pad is changed.

Since a displayed key group is situated in the middle of the keyboard panel in the case of FIG. 29A, scroll areas can be set at respective ends of the track pad. However, in the cases of FIGS. 29B and C, since key groups are situated at one or two of the ends of the keyboard panel, scroll area can not be set at such ends (step S3304).

The operational panel control routine referred to the changed relational table between the operational panel and the track pad and decides a corresponding key button on the keyboard panel, and the corresponding button is focused (step S3305).

The operational panel control routine again watches data change on the track pad transmitted from the remote control device 2 (step S3306).

The system control unit 110 detects whether the track pad is still touched by the finger or not (step S3307).

When the operational panel control routine decides the touching finger is released, it watches whether the track pad is touched again or not for a determined period (until a time out) (step S3321). When the track pad is touched within the time out, the operational panel control routine returns to step S3306 and continues watching touched pressure data and touched position data transmitted from the remote control device 2.

When the track pad is not touched within the predetermined period, the operational panel control routine decides the time is out, stops focusing (step S3322) and returns to step S3101 of the operating mode selecting routine shown in FIG. 31 according to an instruction in step S3323.

When the operational panel control routine decides track pad is touched, it detects a touched position (step S3308) based on position data and the relational table between the operational panel and the track pad generated at step S3304.

The operational panel control routine decides whether the touched position is in one of the scroll areas or not (step S3309). If the touching finger is in the scroll area, a moved direction of the finger is calculated based on currently detected and previously detected position data. When the scroll mode is continued, key elements of the keyboard panel are re-allocated to the track pad in every predetermined period and the relational table between the operational panel and the track pad is changed (step S3331).

The corresponding key button of the keyboard panel is determined based on the relational table between the operational panel and the track pad, and the corresponding key button is focused (step S3310).

If the finger touches a position outside the scroll areas, the operational panel control routine, which stays at step S3310, watches touched pressure data received from the remote control device 2 and detects a touched pressure change to decide whether a key button in the keyboard panel is pressed or not (step S3311).

When the pressure change on the track pad is detected, the operational panel control routine judges whether the finger is being pressed downward or released (step S3341). When the operational panel control routine decides the focused button is pressed, it judges whether an operational flag is set or not (step S3342).

If the operational flag is set, the operational panel control routine decides an instruction to press the corresponding button is executed, and it returns to step S3306 so as to continue watching touched pressure data and touched position data received from the remote control device 2.

If the operational flag is not set yet, the operational flag is set (step S3343). In this stage, since the operation corresponding to the pressed button is not executed yet, color and character display of the pressed button are further changed for a predetermined period so that the TV viewer can recognize the selected operation is going to be executed. At the same time, a recognition sound is outputted to the sound control unit 105 to generate the sound (step S3344) and a corresponding execution order is transmitted to the system control unit 110 (step S3345).

Then the operational panel control routine returns to step S3306 and continues watching touched pressure data and touched position data received from the remote control device 2.

When the operational panel control routine decides the finger is pressed downward based on the pressure change, the operational flag is cleared (step S3351). And the operational panel control routine returns to step S3306 so as to continue watching touched pressure data and touched position data received from the remote control device 2.

Thus a desired character can be inputted when a finger touching on the track pad is moved to a desired position on the track pad and pressed thereon.

FIGS. 30A, B, C and D are views for explaining steps to select characters "T" and "O" by utilizing the keyboard operational panel.

At first a remote control device user touches a position supposed to be character "T" on the allocated track pad as shown in FIG. 28B, but actually the user touches character "R" (see FIG. 30A). Then the key button "R" in the displayed keyboard panel is focused, and the track pad is reallocated as shown in a drawing in the middle of FIG. 30A, at the same time the relational table between the operational panel is also changed from FIG. 28C to a table in the right side of FIG. 30A, according to a series of steps from S3301 to S3305.

When the touching finger is moved, a focused position in the keyboard panel is changed to key button "T" by repeating a series of steps from S3306 to S3311 in FIG. 33 (see FIG. 30B).

At this stage, if the user presses the track pad, a pressed state is detected according to step S3311 in FIG. 33 and character "T" is inputted according to a series steps from S3341 to S3345.

When the touching finger is moved rightward so as to focus character "O", a focused position in the keyboard panel is changed to character "Y" and to character "U". Since, as shown in FIG. 30B, key button "O" is not allocated in the track pad, character "O" is not focused. When the touching finger is further moved rightward and is reached the right end of the track pad, the finger is moved in the scroll area. After the track pad is re-allocated and at the same time the relational table between the operational panel and the track pad are changed twice as shown in FIGS. 30C and D according to step S3331, character "O" is focused.

If the touching finger is moved leftward a little bit to key button "O" (see FIG. 30D) at a time when character "O" is focused or when the touching finger is released from the track pad temporally, a focused position is stopped on the key button "O".

When the same position on the track pad is pressed, the operational panel control routine detects the corresponding key button is pressed according to step S3311 and character "O" is inputted according to a series of steps from S3341 to S3345.

If the touching finger is not pressed or not released, the keyboard panel is further scrolled and character "P" is focused. However, if the touching finger is moved leftward a little bit, the focused position can be easily returned to character "O".

Even the numbers of the key buttons in the operational panel are quite different as shown in FIG. 25A and FIG. 28A, moving operations by the finger on the track pad can be operated in the same feeling by re-allocating the operational panel to the track pad as mentioned above.

However, if the track pad is kept in the initial state where the whole operational panel is allocated to the track pad, operational feelings are different in respective operational panels. Particularly in the case of the operational panel shown in FIG. 28A, the moving rate of the key button is felt too high to handle.

Embodiment 5

Hereinafter, TV program selecting operations through a displayed electronic program table (hereinafter referred as "EPG") utilized for selecting and inspecting TV programs, are explained.

EPG data are received from the antenna 4 of the TV set 1 together with image data and sound data and separated by the decoder unit 102 and stored in the memory unit 111.

The EPG data are files in which program data such as dates, times, channels, program titles, program genres, performers, contents and the like are written as shown in FIG. 34.

Figure 35:
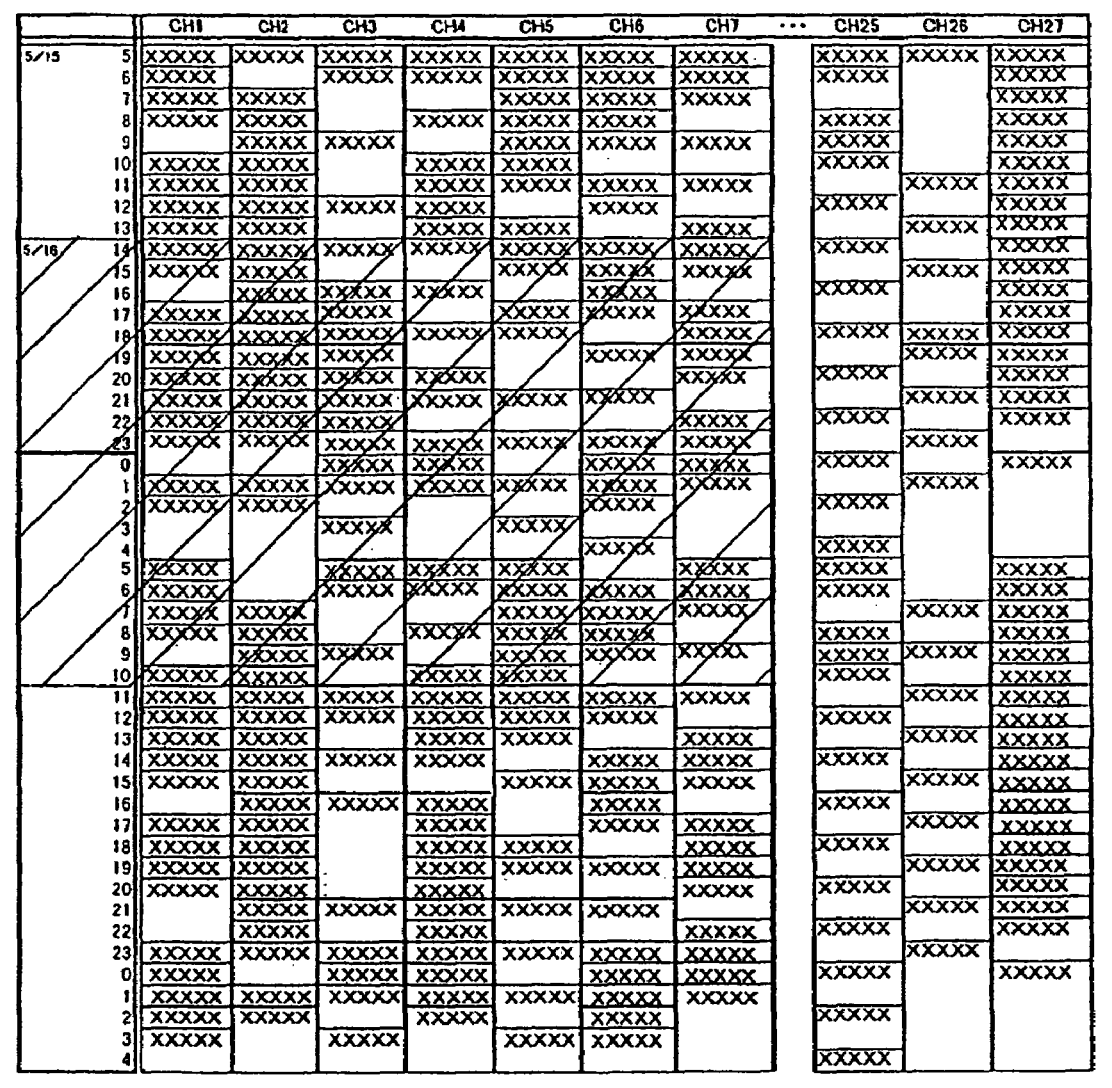

The EPG data are displayed as shown in FIG. 35. However, since the whole EPG data are too large to display at once, the EPG data are partially displayed and displayed data are renewed by scroll operations.

Since other display operations by utilizing menu keys in menu panels are not directly related to the present invention, further explanations are omitted.

When an EPG button shown in FIG. 6 is pressed so as to display an EPG panel, key data corresponding to the pressed button are transmitted from the remote control device 2 to the remote control signal receiving unit 109 of the TV set 1.

When the system control unit 110 in the TV set 1 detects the key data, required data for displaying the EPG data are read out from the memory unit 111. And EPG panel data are constituted, stored in the system control unit 110 and at the same time outputted to the image control unit 103, which instructs the display unit 104 to activate the EPG panel by combining a currently displayed image in the display unit.

Figures 36, 37:
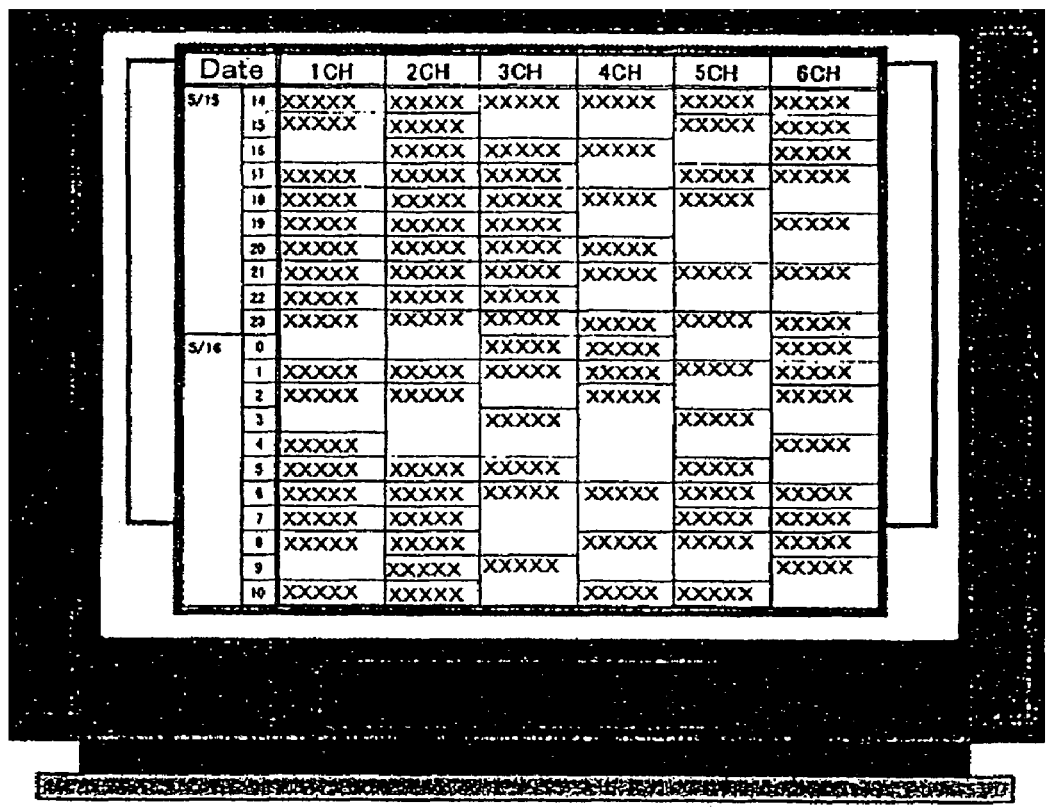
FIG. 36 shows the screen of the TV set where an EPG panel is displayed in embodiment 5.
FIG. 37 is a table showing a constitution of the EPG panel in embodiment 5.

FIG. 36 shows a partially displayed EPG panel derived from FIG. 35 in the display unit of the TV set 1. FIG. 37 is the table showing the constitution of the EPG panel. The EPG panel consists of ID numbers, displayed sizes, positions, displayed data and the like of the respective programs.

In addition scroll data are also included in the table in FIG. 37.

Operations of the EPG panel are also executed based on the flow charts in FIGS. 31 and 33.

In the same way as embodiment 4, when the operational panel control routine detects the EPG panel is activated, the whole EPG panel shown in FIG. 36 is allocated to the whole area of the track pad based on the EPG panel constitution data including corresponding ID numbers to respective areas of the track pad, and a relational table between the operational panel and the track pad is generated.

The operational panel control routine decides whether it is suitable to allocate the whole EPG panel to the whole area of the track pad or not according to step 3104 in FIG. 31. The operational panel control routine also decides whether number of the divided areas on the track pad are larger than a specified number or not, or whether a scroll mode is required or not so as to display a different portion of the EPG panel from the currently displayed portion of the EPG panel. Obviously operations of the EPG panel require the scroll mode.

Figure 38A:
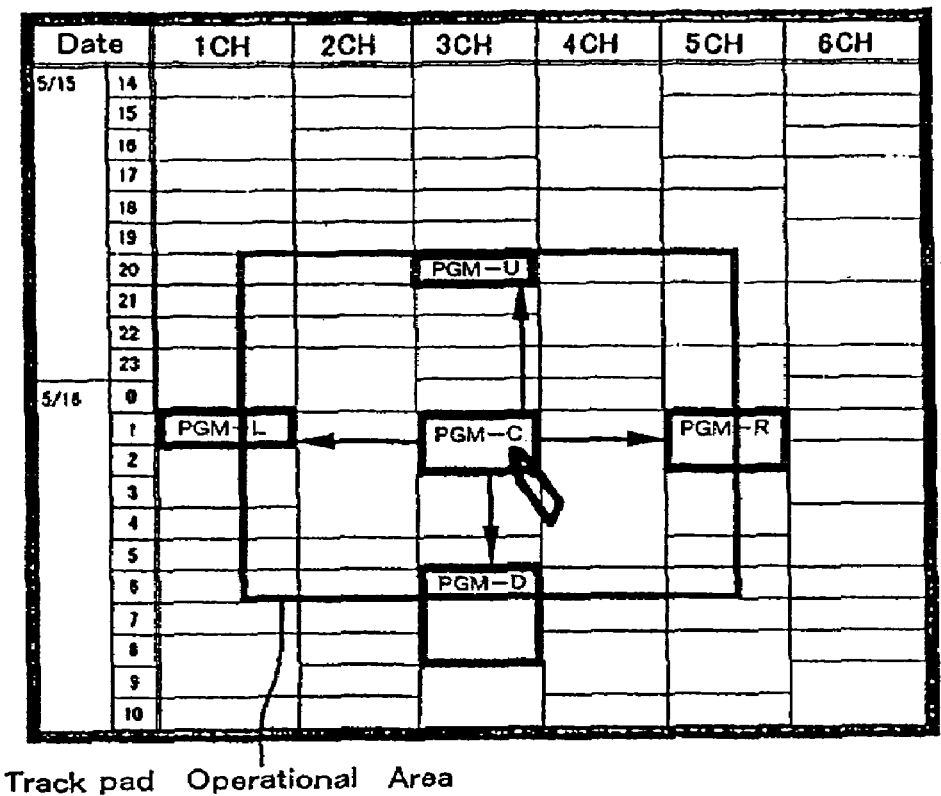
FIGS. 38A and B show an operational status of the EPG panel in embodiment 5 (part 1).

When the finger touches a position on the track pad shown in FIG. 38A, a TV program PGM-C in the EPG panel is focused. A framed area around the focused point in FIG. 36A is allocated to the operational area of the track pad and a peripheral area around the operational area of the track pad is allocated as a scroll area. And the relational table between the operational panel and the track pad is changed (according to steps from S3301 to S3305 in FIG. 33).

Figure 38B:
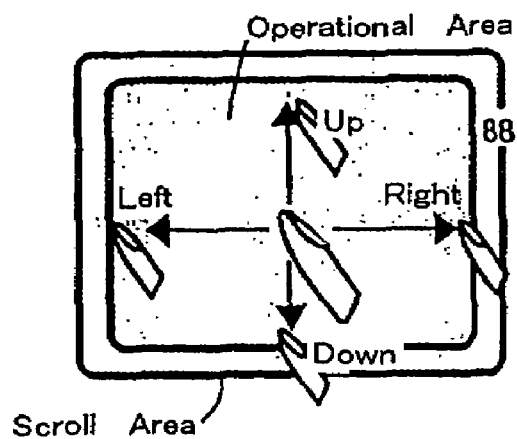

When the touching finger is moved in vertical directions (up/down) or in horizontal directions (left/right) on the track pad as shown in FIG. 38B, focused positions in the EPG panel are shifted from PGM-C to PGM-U, PGM-D, PGM-L or PGM-R.

Figures 39A, 39B:
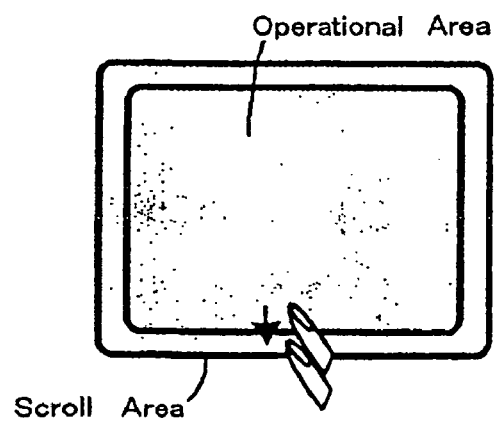
FIGS. 39A and B show an operational status of the EPG panel in embodiment 5 (part 2).

When the touching finger is moved further downward to the scroll area of the track pad, the operational area of the track pad is changed so that the operational area in the EPG panel is shifted to a framed area of the EPG panel as shown in FIG. 39A. The focused position is changed from PGM-D to PGM-FD1 and the relational table between the operational panel and the track pad is also changed so as to correspond to the frame area in FIG. 39A (according to steps from S3306 to S3331 in FIG. 33).

When the touching finger further touches the scroll area, the operational panel control routine finally decides EPG panel data do not exist anymore in the downward direction in step S3309 in FIG. 33.

The operational panel control routine detects scroll data in the EPG panel and requires to change EPG panel data. Then the system control unit changes the current EPG panel data to new EPG panel data as shown in FIG. 40A and the relational table between the operational panel and the track pad is also changed.

Figures 40A, 40B:
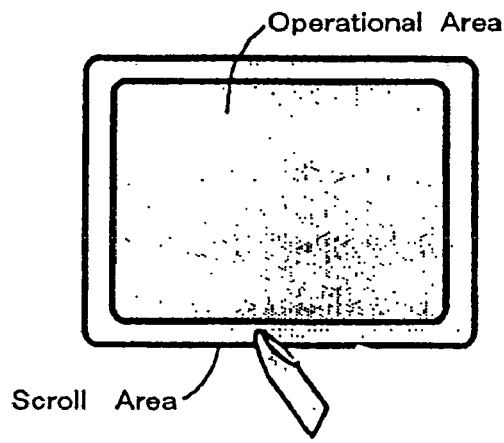
FIGS. 40A and B show an operational status of the EPG panel in embodiment 5 (part 3).
Figure 41:
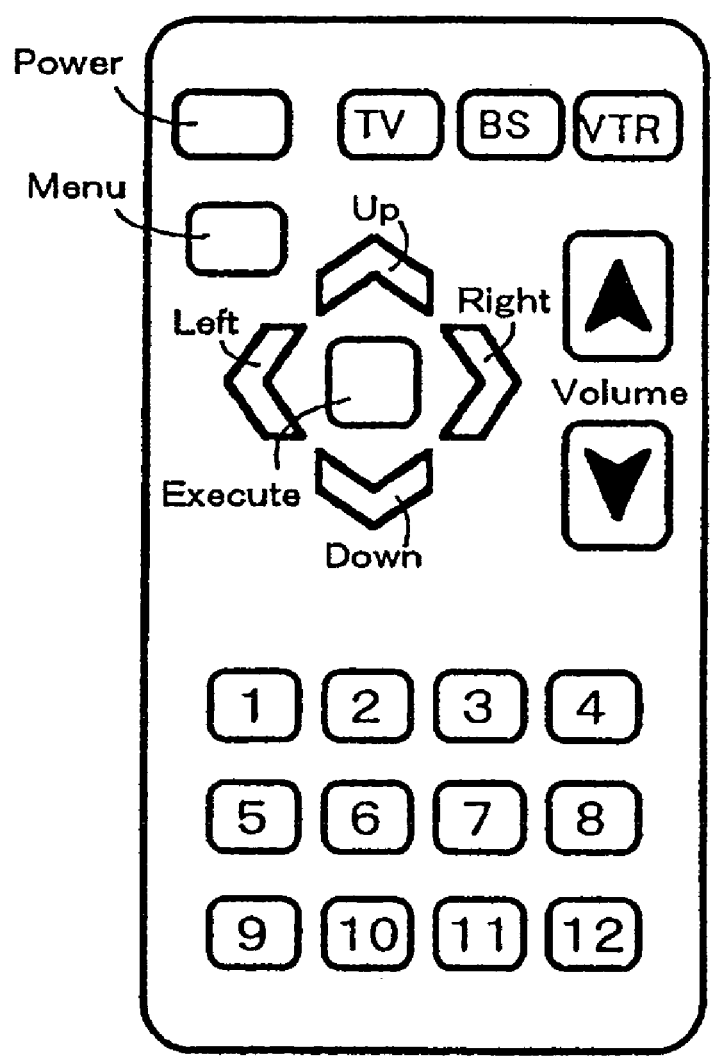
FIG. 41 is a view showing an arrangement of a conventional remote control device.

When the focus operation is executed, the focused panel element is shifted from PGM-FD1, to PGM-FD2 and further to PGM-FD3 according to step S3310 as shown in FIG. 40A.

As described above, an operational panel such as the EPG panel, which is too large to display in one screen, can be operated by the present invention.

The above-described preferred embodiments are merely exemplary of the present invention and are not construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. A display apparatus comprising:
a receiving unit that receives from a remote control device position data corresponding to a contact position, the contact position being detected by a track pad unit and the track pad unit being included in the remote control device;
a communication unit that receives from an external device an operational panel used to control the external device;
a display unit that displays the operational panel received by the communication unit;
a control unit that controls the operational panel using the position data received by the receiving unit; and
a sound output unit that outputs a predetermined sound,
wherein the control unit allocates operable elements included in the operational panel to the track pad unit without changing an array of the operable elements included in the operational panel, and
wherein the predetermined sound is output from the sound output unit, if the control unit determines that an operable element corresponding to the position data is operated.

2. The display apparatus according to claim 1, wherein the receiving unit receives from the remote control device pressure data corresponding to a pressure change, the pressure change being detected by the track pad unit, and
wherein the control unit controls the operational panel using the pressure data received by the receiving unit.

3. The display apparatus according to claim 1, wherein the control unit detects an operable element corresponding to the position data and visually changes the detected operable element.

4. The display apparatus according to claim 1, further comprising:
a tuner unit that receives a television signal,
wherein the display unit displays the television signal received by the tuner unit.

5. The display apparatus according to claim 2, wherein the control unit determines, using the pressure data whether an operable element corresponding to the position data is operated.

* * * * *